US011653051B2

(12) United States Patent
Lin et al.

(10) Patent No.: US 11,653,051 B2
(45) Date of Patent: May 16, 2023

(54) GIFT DISPLAY METHOD AND SYSTEM IN WEB-BASED LIVE BROADCAST

(71) Applicant: SHANGHAI BILIBILI TECHNOLOGY CO., LTD., Shanghai (CN)

(72) Inventors: Xian Lin, Shanghai (CN); Shuai Sun, Shanghai (CN); Xiaohu Li, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 28 days.

(21) Appl. No.: 17/517,095

(22) Filed: Nov. 2, 2021

(65) Prior Publication Data
US 2022/0141521 A1    May 5, 2022

(30) Foreign Application Priority Data
Nov. 3, 2020    (CN) .......................... 202011212508.X

(51) Int. Cl.
*H04N 21/431*    (2011.01)
*H04N 21/4784*    (2011.01)
(Continued)

(52) U.S. Cl.
CPC ..... *H04N 21/4312* (2013.01); *G06F 3/04842* (2013.01); *G06F 3/04847* (2013.01);
(Continued)

(58) Field of Classification Search
CPC .......... H04N 21/4312; H04N 21/2187; H04N 21/4532; H04N 21/4784; H04N 21/4788;
(Continued)

(56) References Cited

U.S. PATENT DOCUMENTS

2017/0083962 A1\* 3/2017 Agarwal ............ G06Q 30/0631
2019/0124400 A1\* 4/2019 Wang .................. H04N 21/2187
(Continued)

FOREIGN PATENT DOCUMENTS

CN        105897770 A    8/2016
CN        106131698 A    11/2016
(Continued)

*Primary Examiner* — Alazar Tilahun
(74) *Attorney, Agent, or Firm* — BakerHostetler

(57) ABSTRACT

The present disclosure describes techniques for controlling display of gifts in a web-based live broadcast The techniques comprises storing a host state gift object in a host state queue, wherein the host state gift object corresponds to a gift-giving behavior of a first user associated with a first client computing device; storing a plurality of guest state gift objects in a guest state queue, wherein the plurality of guest state gift objects correspond to gift-giving behaviors of other users; storing a plurality of display gift objects in a display queue; updating the display queue based on the host state queue or the guest state queue, wherein the host state queue has a higher priority than the guest state queue for updating the display queue; and causing to display each display gift object on an interface of the first client computing device in a form of a combo bar.

20 Claims, 23 Drawing Sheets

(51) Int. Cl.
*H04N 21/2187* (2011.01)
*H04N 21/45* (2011.01)
*G06F 3/0484* (2022.01)
*G06F 3/04842* (2022.01)
*G06F 3/04847* (2022.01)

(52) U.S. Cl.
CPC ..... *H04N 21/2187* (2013.01); *H04N 21/4532* (2013.01); *H04N 21/4784* (2013.01)

(58) Field of Classification Search
CPC ............ H04N 21/472; H04N 21/4722; H04N 21/478; G06F 3/04842; G06F 3/04847; G06Q 30/0208
See application file for complete search history.

(56) References Cited

U.S. PATENT DOCUMENTS

| | | | | |
|---|---|---|---|---|
| 2021/0042830 A1* | 2/2021 | Burke | ................... | G06Q 20/384 |
| 2021/0065421 A1* | 3/2021 | Kurabuchi | ....... | H04N 21/23412 |
| 2021/0099761 A1* | 4/2021 | Zhang | .................. | H04N 21/233 |

FOREIGN PATENT DOCUMENTS

| | | | |
|---|---|---|---|
| CN | 106937158 A | 7/2017 | |
| CN | 107085540 A | 8/2017 | |
| CN | 107172488 A | 9/2017 | |
| CN | 107241636 A | 10/2017 | |
| WO | WO 2018/113648 A1 | 6/2018 | |

\* cited by examiner

GIFT DISPLAY METHOD AND SYSTEM IN WEB-BASED LIVE BROADCAST

CROSS-REFERENCE TO RELATED APPLICATION

The present invention claims priority of Chinese patent application filed on Nov. 3, 2020, with an application number CN202011212508.X and a name "gift display method and system in web-based live broadcast". The entire content of the above-identified application is incorporated in the present invention by reference.

BACKGROUND

With the rapid popularization of Internet technology, a web-based live broadcast is being received and loved by more and more individuals. A web-based live broadcast generally involves a live broadcast platform, an anchor terminal, and audience terminals, wherein the anchor terminal can provide multimedia content (e.g. video content) to the audience terminals through the live broadcast platform, and can also receive multimedia content (e.g. comment content) provided by the audience terminals through the live broadcast platform, thus realizing effect of interacting while broadcasting.

Due to strong live and interactive nature, the web-based live broadcast is favored by more and more viewers and anchors. In a process of the web-based live broadcast, audiences can give virtual gifts to an anchor through the audience terminals, the virtual gifts can be displayed on a live broadcast room interface of the anchor terminal and each audience terminal in real-time, to realize the gift-giving interaction in the live broadcast room and improve the popularity and attention of the anchor.

SUMMARY

In view of this, the purpose of the embodiment of the application is to provide a gift display method in a web-based live broadcast, system, computing device, and computer-readable storage medium, which can improve the gift display effect and meet the interactive needs of audiences in the broadcast room.

One aspect of the embodiment of the present application provides a gift display method in a web-based live broadcast, applied to an audience terminal, comprising: storing a host state gift object through a host state queue, the host state gift object corresponding to a target user identification of the audience terminal; storing multiple guest state gift objects through a guest state queue, each guest state gift object corresponding to a corresponding other user identification; storing multiple display gift objects through a display queue, and updating the display queue through the host state queue or the guest state queue, wherein an update priority of the host state queue is higher than an update priority of the guest state queue; and displaying each display gift object on a display interface in a form of a combo bar.

Optionally, further comprising: receiving a gift message to be stored, the gift message to be stored comprising a combo identification to be stored and combo times to be stored; determining whether the host state queue, the guest state queue, and the display queue comprise a target gift object carrying the combo identification to be stored; determining whether combo times in the target gift object is less than the combo times to be stored when one of the host state queue, the guest state queue, and the display queue comprises the target gift object; and updating the target gift object according to the gift message to be stored when the combo times in the target gift object is less than the combo times to be stored.

Optionally, further comprising: comparing whether a combo value of the gift message to be stored is greater than a combo value of one of the display gift objects in the display queue when none of the host state queue, the guest state queue, and the display queue comprises the target gift object; deleting a display gift object with a lowest combo value in the display queue, and adding the gift message to be stored to the display queue as a new display gift object to update the display queue, when the combo value of the gift message to be stored is greater than the combo value of one of the display gift objects in the display queue; determining whether a user identification of the gift message to be stored is same as the target user identification when the combo value of the gift message to be stored is not greater than the combo value of any one display gift object in the display queue; updating the host state queue according to the gift message to be stored when the user identification of the gift message to be stored is same as the target user identification; adding the gift message to be stored to the guest state queue as a new guest gift object when the user identification of the gift message to be stored is not same as the target user identification.

Optionally, wherein the adding the gift message to be stored to the guest state queue as a new guest gift object, comprises: determining whether a storage capacity of the guest state queue is full; adding the gift message to be stored as the new guest gift object to an end of the guest state queue when the storage capacity is not full; and discarding the gift message to be stored when the storage capacity is full.

Optionally, wherein the display interface comprises one or more display combo bars in a display state, and each display combo bar corresponds to a display gift object; and the displaying each display gift object on a display interface in a form of a combo bar, comprises: detecting UI callback events of the each display combo bar; when a UI callback event of one display combo bar of the display combo bars is detected, determining whether a display gift object corresponding to the one display combo bar has updated data; performing a refresh operation on the one display combo bar when the display gift object corresponding to the one display combo bar has updated data; removing the display gift object corresponding to the one display combo bar from the display queue when the display gift object corresponding to the one display combo bar has no updated data.

Optionally, wherein the display interface comprises one or more display combo bars in a display state; and the displaying each display gift object on a display interface in a form of a combo bar, comprises: detecting UI callback events of the each display combo bar; when a UI callback event is detected, taking out, from the display queue, a target display gift object that is newly added; determining whether a combo bar corresponding to the target display gift object can be displayed on the display interface; performing following operations when the combo bar corresponding to the target display gift object can be displayed on the display interface:

refreshing a target display combo bar according to the target display gift object when a combo identification in the target display gift object is same as a combo identification of a target display combo bar in the one or more display combo bars; inserting the combo bar corresponding to the target display gift object into a vacant position of the display interface when the combo identification in the target display gift object is different from the combo identification of any one of the one or more display combo bars.

Optionally, wherein the determining whether a combo bar corresponding to the target display gift object can be displayed on the display interface, comprises: determining whether a user identification of the target display gift object is same as the target user identification; determining whether the display interface has a display position for displaying a host state display combo bar when the user identification of the target display gift object is same as the target user identification, the host state display combo bar associating with the target user identification; determining whether a display position of the display interface is used up, when the user identification of the target display gift object is not same as the target user identification, or the display interface has not the display position for displaying the host state display combo bar; determining whether the one or more display combo bars comprise the target display combo bar when the display position of the display interface is used up, wherein the target display combo bar and the target display gift object have a corresponding combo identification; and determining that the combo bar corresponding to the target display gift object can be displayed on the display interface when the display position on the display interface is not used up, or the one or more display combo bars comprise the target display combo bar.

Optionally, wherein the refreshing the target display combo bar according to the target display gift object when a combo identification in the target display gift object is same as a combo identification of the target display combo bar in the one or more display combo bars, comprises: determining whether combo times in the target display gift object is greater than combo times of the target display combo bar; discarding the target display gift object when the combo times in the target display gift object is not greater than the combo times of the target display combo bar; refreshing the target display combo bar according to the target display gift object, and adjusting the display position of the target display combo bar when the combo times in the target display gift object is greater than the combo times of the target display combo bar.

Optionally, wherein the inserting the combo bar corresponding to the target display gift object into a vacant position of the display interface when the combo identification in the target display gift object is different from the combo identification of any one of the one or more display combo bars, comprises: determining whether a user identification of the target display gift object is same as the target user identification; determining whether the display interface has a display position for placing a host state display combo bar when the user identification of the target display gift object is same as the target user identification, the host state display combo bar associating with the target user identification; refreshing the host state display combo bar according to the target display gift object when the display interface has a display position for placing the host state display combo bar; determining that the display position on the display interface is used up when the display interface has not the display position for placing the host state display combo bar; deleting a display combo bar in the display interface, and inserting the combo bar corresponding to the target display gift object into the vacant position of the display interface when the display position on the display interface is used up; inserting the combo bar corresponding to the target display gift object into the vacant position of the display interface when the display position on the display interface is not used up.

Optionally, wherein the inserting the combo bar corresponding to the target display gift object into a vacant position of the display interface when the combo identification in the target display gift object is different from the combo identification of any one of the one or more display combo bars, further comprises: performing following operations when the user identification of the target display gift object is not same as the target user identification: storing the target display gift object into a display container; determining whether a number of current display containers is greater than a number of display positions; discarding the target display gift object when the number of the current display containers is greater than the number of display positions; determining whether a number of display combo bars in the display interface is less than the number of display positions when the number of the current display containers is not greater than the number of display positions; deleting a display combo bar in the display interface, and inserting the combo bar corresponding to the target display gift object into the display interface when the number of display combo bars in the display interface is less than the number of display positions.

Optionally, further comprising: when entering a target live room, obtaining a gift resource table associated with the target live room; and pre-downloading some gift resources to obtain local gift resources according to a weight value of each gift resource in the gift resource table.

Optionally, wherein when a combo bar needs to be displayed, the method further comprises:

detecting whether the local gift resources comprise all gift resources associated with the combo bar; raising a priority of a target download task when the local gift resource does not comprise all the gift resources associated with the combo bar, and the target download task is configured to download each gift resource associated with the combo bar.

Optionally, further comprising: when one of the combo bars on the display interface is displayed, storing the displayed combo bar in a combo bar buffer pool.

One aspect of the embodiment of the present application also provides a gift display system in a web-based live broadcast, the gift display system in the web-based live broadcast comprising: a first storing module, storing a host state gift object through a host state queue, the host state gift object corresponding to a target user identification of the audience terminal; a second storing module, storing multiple guest state gift objects through a guest state queue, each guest state gift object corresponding to a corresponding other user identification; an updating module, storing multiple display gift objects through a display queue, and updating the display queue through the host state queue or the guest state queue, wherein an update priority of the host state queue is higher than an update priority of the guest state queue; and a displaying module, displaying each display gift object on a display interface in a form of a combo bar.

One aspect of the embodiment of the present application also provides a computing device, comprising a memory, a processor, and a computer program that is stored in the memory and operable on the processor, wherein the processor executes the computer program for implementing steps of the above-mentioned gift display method in a web-based live broadcast.

One aspect of the embodiment of the present application also provides a computer-readable storage medium, which stores a computer program, the computer program can be executed by at least one processor, to cause the at least one processor to implement the steps of the above-mentioned gift display method in a web-based live broadcast.

The gift display method in a web-based live broadcast, system, device and computer-readable storage medium provided by the embodiment of the present application maintain a combo bar buffer pool to be displayed by using three-level buffer queues (host state queue, guest state queue, and display queue), so that a large number of incoming gift messages will not be easily discarded and not be displayed. When a large number of gift messages flood in, hierarchical management is performed through the three-level buffer queue to ensure that the large number of gift messages are managed efficiently, and the combo bar corresponding to each gift message is reasonably displayed on the display interface, so as to ensure the display effect.

DETAILED DESCRIPTION OF ILLUSTRATIVE EMBODIMENTS

Figure 1:
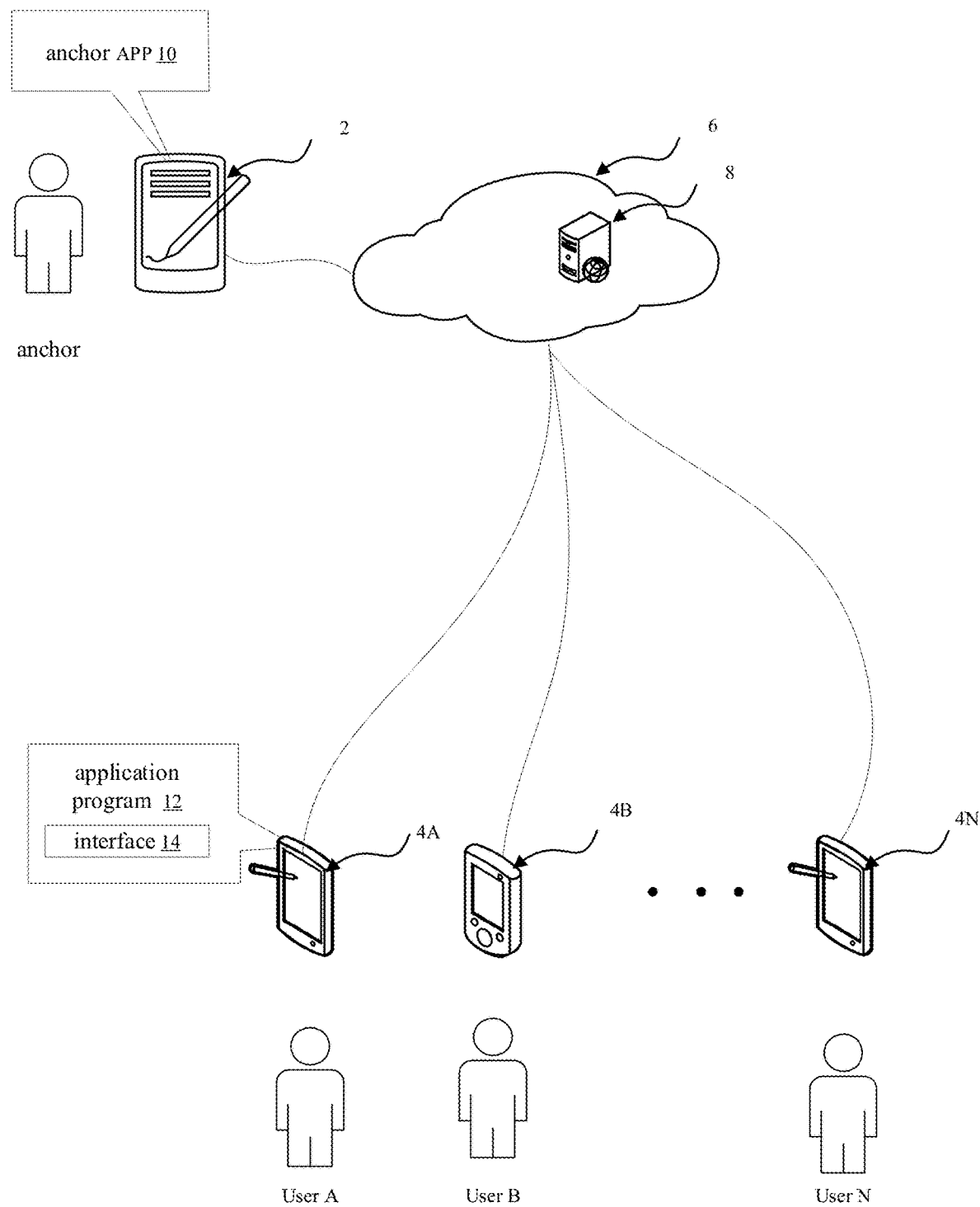
FIG. 1 schematically shows an application environment diagram according to an embodiment of the present application.

To make the objectives, technical solutions, and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

It should be noted that the description of "first", "second" and the like in the present application is used for the purpose of description only, and cannot be construed as indicating or implying its relative importance or implicitly indicating the number of the indicated technical features. Thus, features defining "first" or "second" may include at least one of the features, either explicitly or implicitly. In addition, the technical solutions in the embodiments can be combined with each other, but must be based on the realization of those ordinary skilled in the art, when the combinations of the technical solutions are contradictory or unrealizable, it shall be deemed that the combinations of the technical solutions do not exist and are not within the protection scope required by the present application.

In the description of the present application, it should be understood that a numerical label before the steps does not identify the sequence of execution of the steps, and is only used to facilitate the description of the application and distinguish each step, and therefore cannot be understood as a limitation of the application.

During a web-based live broadcast, audiences can present virtual gifts to an anchor through an audience terminal, the virtual gifts can be displayed in real-time on a live broadcast room interface of the anchor terminal and each audience terminal, to realize a gift-giving interaction of a live broadcast room. However, in the prior art, gift-giving interaction of the live broadcast room has poor gift display effect when a large number of gifts appear, the gift presentation and interaction are poor, combo bar supports few styles, and the rendering effect is poor, which cannot meet interactive needs of audiences in the live broadcast room.

The present application will provide one or more embodiments to solve the above-mentioned various problems. In these embodiments, according to multiple standards such as a host/guest state, a value of gift-giving props, a combo behavior, etc., gift-giving response behaviors can be classified and sorted, and a combo bar with a corresponding level can be displayed. Through real-time changes in display duration, combo animation, and display position priority, interaction of the user's gift-giving behavior is enhanced, and viewing experience in the live broadcast room is improved. A back-end server sends gift information and combo bar material resources, and a client renders corresponding views according to business rules. Specifically, through a distribution of a background configuration, the display of customized style combo bars with a specified duration is supported in the live broadcast room, and the following technologies are implemented: (1) supporting real-time configuration and delivery of background image resources of a combo bar; (2) updating a display duration in real-time through a socket instruction when the combo is triggered; (3) supporting customized combo bar styles (single gift, batch gift, ordinary live broadcast room, studio live broadcast room); (4) supporting rich display animation (insertion, removal, exchange, replacement) of combo bars; (5) multi-level buffer management strategy of combo bars.

Firstly, some explanations of terms involved in the present application are provided:

Combo bar: a graphical interface composed of resource pictures, font colors, text content, and animation;

Combo: it is called combo when a user gives a same quantity and a same gift prop several times in a certain period of time;

Main state: gifts are given by yourself in a live broadcast room;

Guest state: gifts are given by others in a live broadcast room.

Secondly, for ease of understanding, as shown in FIG. 1, an environmental application diagram of a gift display method in a web-based live broadcast is provided. In a live broadcast scenario, an anchor terminal 2 can push live broadcast data to audience terminals (eg, 4A, 4B, . . . , 4N) in real-time.

The anchor terminal 2 is configured to generate live broadcast data in real-time and perform streaming operations of the live broadcast data. The live broadcast data may comprise audio data or video data. The anchor terminal 2 may be an electronic device such as a smartphone or a tablet computer. The anchor terminal 2 may include an anchor APP 10, which is configured to generate and push the live broadcast data, and receive interactive information.

The audience terminals (i.e., client computing devices) (e.g., 4A, 4B, . . . , 4N) can be configured to receive live broadcast data of the anchor terminal 2 in real-time. The audience terminals (e.g., 4A, 4B, . . . , 4N) can be any type of computing device, such as a smartphone, a tablet device, a laptop computer, a set-top box, a smart TV, etc. The audience terminals (e.g., 4A, 4B, . . . , 4N) may have a built-in browser or a special program, and receive the live broadcast data through the browser or the special program to output content to the users associated with the audience terminals. The content may include video, audio, comment, text data, and/or the like.

The audience terminals (e.g., 4A, 4B, . . . 4N) may include an application program 12. The application program 12 outputs (for example, displays, presents) content to the users associated with the audience terminals. The content may be presented in a page format and may include video, audio, comment, text data, and/or the like. The audience terminals (e.g., 4A, 4B, . . . , 4N) may include an interface 14, and the interface 14 may include input elements. For example, the input elements may be configured to receive user instructions, and the user instructions may cause audience terminals (e.g., 4A, 4B, . . . , 4N) to perform various operations, such as sending virtual gifts.

The anchor terminal 2 and the audience terminals (e.g., 4A, 4B, . . . , 4N) can provide network services through one or more networks 6. As an example, the network 6 may include various network devices, such as routers, switches, multiplexers, hubs, modems, bridges, repeaters, firewalls, proxy devices, and/or the like. The network 6 may include physical links, such as coaxial cable links, twisted pair cable links, optical fiber links, combinations thereof, and/or the like. The network 6 may include wireless links, such as cellular links, satellite links, Wi-Fi links, and/or the like.

The network 6 includes a live broadcast platform 8. The live broadcast platform 8 can allocate live broadcast channels (i.e., live broadcast rooms) for interactions between the anchor terminal 2 and the audience terminals (e.g., 4A, 4B, . . . , 4N). The live broadcast platform 8 can be used as an interactive medium between the anchor terminal 2 and the audience terminals (e.g. 4A, 4B, . . . , 4N), and can also be used to control the network connection between the anchor terminal 2 and the audience terminals (e.g., 4A, 4B, . . . , 4N).

The live broadcast platform 8 can be a server, or a server cluster, or a cloud computing service center. The live broadcast platform 8 can provide live broadcast services and interactive services for the anchor terminal 2 and the audience terminals (e.g., 4A, 4B, . . . , 4N).

As an example, the following provides general flows of gift interactions during the live broadcast:

(1) The audience terminal 4A can obtain and display live broadcast data and interactive data in a live broadcast room, and the interactive data may be virtual gifts, texts, etc.;

(2) The audience terminal 4A can receive a user instruction to trigger a generation of a virtual gift request, and send the virtual gift request to the live broadcast platform 6, the virtual gift request may carry identification for identifying a specific virtual gift;

(3) Based on the virtual gift request, the live broadcast platform 6 sends virtual gift information to each terminal (anchor terminal 2, audience terminals 4A, 4B, . . . , 4N) that log in to the live broadcast room;

(4) After receiving the virtual gift information, each terminal renders and displays the virtual gift information on an interface of the live broadcast room.

The audience terminal 4A can also receive and display gift objects triggered by other terminals.

Figure 2:
FIG. 2 schematically shows a display interface displaying a combo bar.

When a same user continuously presents a same gift, the server 8 generates a gift object carrying combo information. As shown in FIG. 2, when receiving the gift object carrying combo information, the audience terminal 4A can display a corresponding combo bar. As an example: when a user sends multiple virtual gift requests for same gift multiple times in a certain period of time through a certain audience terminal (for example, 4C), the live broadcast platform 6 generates and delivers a corresponding gift object, and the delivered gift object carries combo information such as a combo identification, combo times, and a display duration of the combo bar. The display duration of the combo bar can be increased non-linearly according to the value of the gift, the combo times, and the like.

As an example:

(1) The live broadcast platform 6 receives a first virtual gift request sent by the audience terminal 4C, and the first virtual gift request corresponds to a gift identification X; and in response to the first virtual gift request, the live broadcast platform 6 delivers a corresponding gift object Y1 to each terminal (such as the anchor terminal 2, the audience terminals 4A, 4B, 4D, . . . 4N);

(2) The live broadcast platform 6 receives a second virtual gift request sent by the audience terminal 4C, and the second virtual gift request corresponds to the gift identification X; determines whether the first virtual gift request and the second virtual gift request correspond to a combo behavior according to a time interval between the first virtual gift request and the second virtual gift request; when the first virtual gift request and the second virtual gift request correspond to combos, generates a gift object Y2, which may include: a user identification who gave the gift, a gift identification, combo times (2 times), a combo identification, etc; and broadcasts the generated gift object to each terminal (e.g., anchor terminal 2, audience terminal 4a, 4b, 4D, . . . 4N).

(3) The live broadcast platform 6 receives a third virtual gift request sent by the audience terminal 4C, and the third virtual gift request corresponds to the gift identification X; determines whether the first virtual gift request, the second virtual gift request, and the third virtual gift request correspond to a combo behavior according to a time interval among the first virtual gift request, the second virtual gift request, and the third virtual gift request; when the host state queue, the guest state queue, and the third virtual gift request correspond to the combo behavior, generates a gift object Y3, which may include: a user identification who gave the gift, a gift identification, combo times (3 times), a combo identification, etc.; and broadcasts the generated gift object to each terminal.

(4) The audience terminal 4A receives the gift objects Y1, Y2, Y3, . . . , and renders according to at least one of these gift objects to display a corresponding combo bar.

It should be noted that a combo bar can support multiple animation types, such as:

1. a combo digital animation (such as zooming in and out of imitation heartbeat animation);

2. a whole insert animation of a single combo bar (for example, from nothing to something, and support left and right animation directions);

3. a whole remove animation of a single combo bar (for example, from something to nothing, and support left and right animation directions);

4. a whole exchange animation between two adjacent combo bars (for example, the upper and lower combo bars exchange animation as a whole);

5. a whole replacement animation between new and old combo bars (for example, the new combo bar completely replaces the old combo bar).

Style elements of a combo bar may include the following:

1. background pictures (a complete background picture can be distributed for replacement, and various color values can be distributed, and can be a gradient picture drawn by a front end); it should be noted that the advantage of distributing color values is to reduce a bandwidth cost of image distribution, and the advantage of distributing complete images is that it can support free customization of background images of various shapes;

2. a user avatar (display and hide can be configured, and the user avatar is pre-loaded to ensure that the avatar is stably exposed and displayed);

3. a user avatar frame (distributing pictures, supporting customization);

4. a user nickname;

5. a description of a gift-giving behavior (for example Longbin 9527 "gives" rockets, Longbin 9527 "feeds" certain items, and other customizable content);

6. a single gift-giving behavior, including a number of gift items with the same type (can be spliced by local digital pictures, static without animation);

7. a continuous gift-giving behavior, based on a number of consecutive gift-giving times (combo times, which can be regarded as an effective combo if a time interval of each same gift-giving behavior is less than an agreed value), which can be spliced by local digital pictures, and comes with heartbeat animation, and is more dynamic 8. special item tags (e.g. a gift is only available for purchase by users of Grand Voyage, displaying a limited label "exclusive to Grand Voyage", and the content can be customized);

9. a name of the gift item;

10. picture of gift item (supporting animation);

Above, the combo bar is highly customizable. Except that local digital pictures are local pictures, the other pictures can be pictures delivered by the server and support real-time update and replacement. (There are two types of real-time updates here: A, background image data of the combo bar is directly delivered with the interface and broadcast; B, gift animation material, which is updated every time when entering the live broadcast room, or can also be updated when it is detected that there is gift data that is not available locally in the interface and broadcast distribution data).

It should be noted that the audience terminal 4A can receive and display combo bars of gifts from other users, and can also receive and display combo bars of gifts sent by a target user herself/himself. The audience terminal 4A will be further introduced below.

Figure 3:
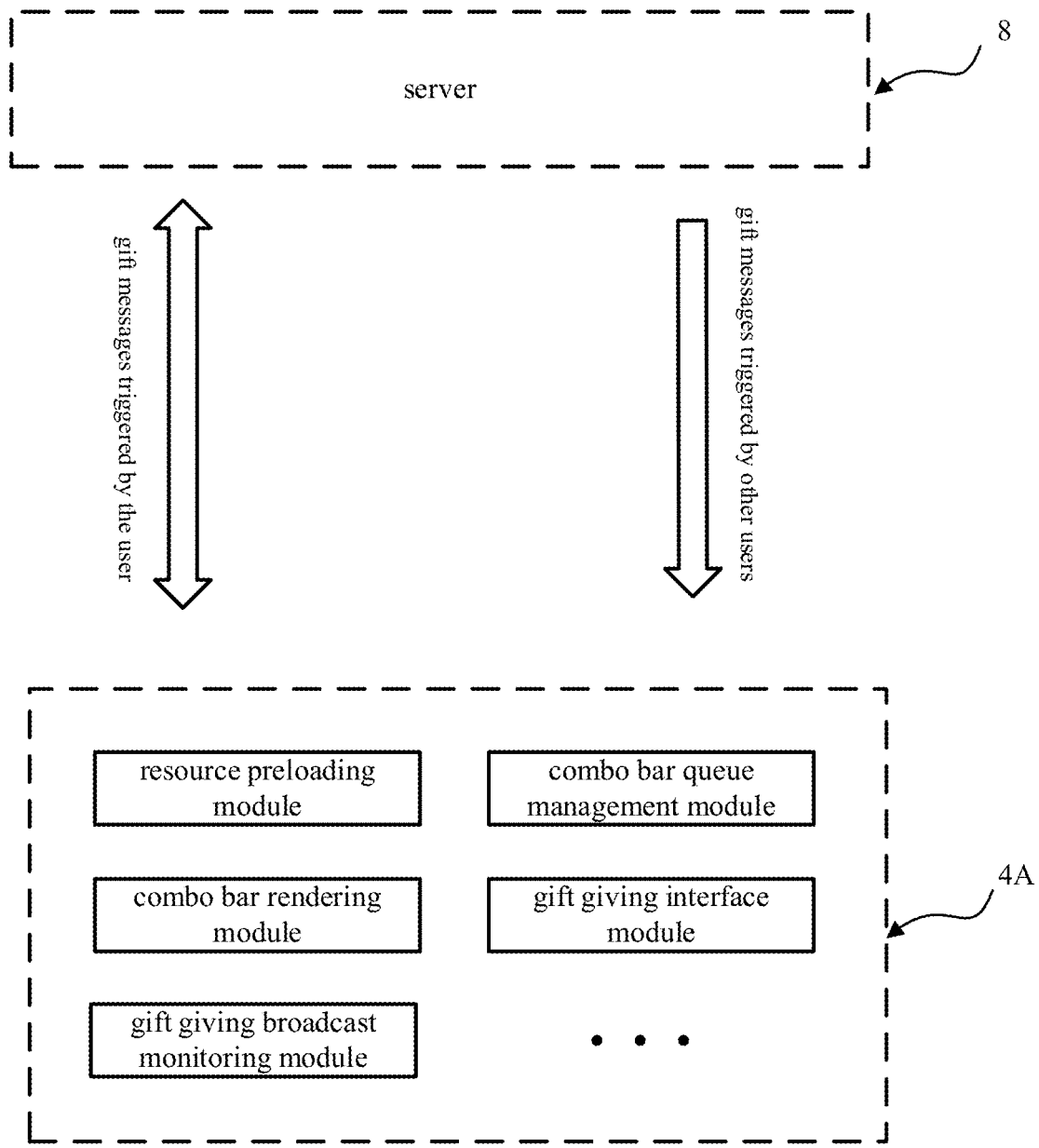
FIG. 3 schematically shows an internal function diagram of an audience terminal.

As shown in FIG. 3, the audience terminal 4A may include one or more of the following modules: a resource preloading module, a combo bar queue management module, a combo bar rendering module, a gift-giving interface module, a gift-giving broadcast monitoring module, and so on.

(1) About the Resource Preloading Module:

The combo bar may be a combination of a series of text, pictures, animations, etc., involving many image resources (for example, gift animations, combo bar background images, user avatars). The resource preloading module lies in how to ensure a complete display of the combo bar. In actual business scenarios, the display of the combo bar is time-sensitive, and the display time is short, and a large number of image resources need to be loaded. Therefore, the resource preloading module is configured to:

1. Download gift resource materials in advance;

a) when entering a target live broadcast room, obtaining a gift resource table associated with the target live broadcast room;

b) opening up an independent thread after the gift resource table is obtained, and pre-downloading some gift resources (related image resources are downloaded in order in advance) according to a weight value of each gift resource in the gift resource table, to obtain local gift resources;

2. Update local gift resources in real-time;

a) detecting whether the local gift resources include all gift resources associated with the combo bar when the combo bar needs to be displayed;

b) raising a priority of a target download task when the local gift resources do not comprise all the gift resources associated with the combo bar, and the target download task is configured to download each gift resource associated with the combo bar.

c) requesting an interface immediately to update the gift resource material table and downloading relevant resource materials in advance, when the gift resource table does not have a corresponding gift record;

3. Download and buffer user avatars in advance;

The user avatar required in the combo bar is downloaded in advance when waiting for display, rather than waiting until the combo bar has been displayed.

(2) About the combo bar queue management module:

A major difficulty of combo bars is that there are limited positions to display combo bars at the same time (for example, up to 3), however, in peak periods, tens of thousands of users may be giving gifts to an anchor at the same time in some live broadcast rooms, thus tens of thousands of different combo bars are triggered. When a large number of gift messages flood in, management of these combo bars needs to optimize.

Figure 4:
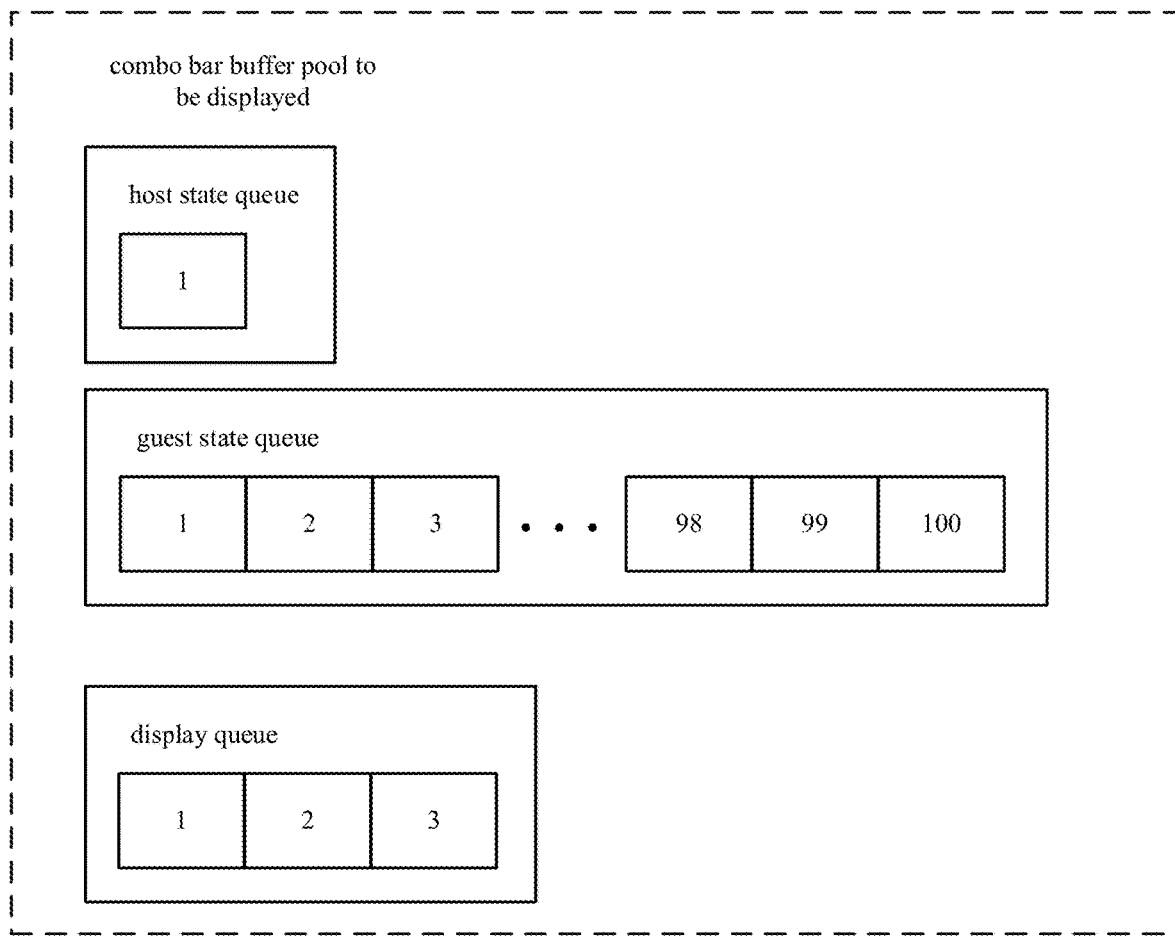
FIG. 4 schematically shows a schematic diagram of a three-level buffer queue.

The embodiment of the present application can adopt a three-level buffer queue to manage the combo bar:

As shown in FIG. 4, the three-level buffer queue includes a host state queue, a guest state queue, and a display queue.

The host state queue is configured to store a host state gift object, and the host state gift object corresponds to a target user identification of the audience terminal 4A; the host state queue can be set to store only one message, that is, when there is a new host state gift object, the old host state gift object is replaced in the host state queue with the new host state gift object;

The guest state queue is configured to store multiple guest state gift objects, and each guest gift object corresponds to a corresponding other user identification;

The display queue is configured to store multiple display gift objects.

Each independent gift object stored in the host state queue, the guest state queue, and the display queue can be determined by a combo identification (Combo_ID) uniquely.

When a user gives a same gift several times at a certain time, the audience terminal 4A will receive multiple gift objects with a same COMBO_ID returned by the server 8, and these gift objects have same parameters as following:

a) User identification (i.e. identification of a gift-giving user);

b) An anchor identification of an anchor who received the gift c) Gift identification;

d) A number of gifts given by a single giving behavior;

The single gift-giving behavior with the same four parameters above is called a "same gift-giving behavior". For a gift object with a "same gift-giving behavior", the following parameters are different: combo times, that is, a cumulative combo number of continuous gift-giving behaviors. When a time interval of "the same gift-giving behavior" is less than an agreed value, it can be counted as an effective combo. For example, a user gives 10 gifts each time and gives them 2 times in a row, a total of 20 gifts are given, then combo times is 2.

The use of a three-level buffer queue can have the following technical effects:

1. The combo bar buffer pool to be displayed (host state queue, guest state queue, and display queue) is maintained, so that the gift object will not be easily discarded and not displayed;

2. The combo bar buffer pool to be displayed can support a data real-time update of a "same gift-giving behavior" object (including but not limited to the "combo times"). This has an advantage of ensuring that the latest gift object is not lost during execution of an animation of a combo bar.

(3) About the Combo Bar Rendering Module

Main problems of combo bar rendering are as follows: ① frequent creation and high memory consumption; ② complex elements, continuous creation, and a high CPU usage.

The combo bar rendering module is configured to render the combo bar. The combo bar rendering module is further configured to maintain a combo bar buffer pool, the combo bar buffer pool is configured to store idle combo bars after use (the whole rendered combo bar); when a combo bar needs to be displayed, it is obtained from the combo bar buffer pool; when there is an idle combo bar, it is used directly without re-creating. This can reduce the consumption of excessive memory, CPU, and other resources by frequently creating combo bars, and also reduce unnecessary time consumption, improve rendering effects, and reduce lag.

(4) About the Gift-Giving Interface Module:

The gift-giving interface module is configured to receive the gift objects of gifts given by the audience terminal 8 and fed back by the server 8. As an example, when a target user gives a gift to a certain live broadcast room through the audience terminal 4A, the gift-giving interface module may receive a gift object of successful gift-giving returned by the server 8, the gift object carries information needed to display the combo bar. It should be noted that only the terminal that actually gives the gift can obtain the information for displaying the combo bar triggered by this gift according to the corresponding gift-giving interface module.

(5) About the Gift-Giving Broadcast Monitoring Module:

The gift-giving broadcast monitoring module is configured to monitor a gift object broadcast by the server 8 through a socket.

After receiving a gift-giving request, the server 8 broadcasts the gift object to all terminals (anchor terminal and each audience terminal) in a current live broadcast room.

It can be seen from (4) and (5): the gift-giving request sent by the user through the audience terminal 4A can receive the gift object returned by the server 8 through the gift-giving interface module; the gift-giving request sent by other users through other audience terminals can, through the gift-giving broadcast monitoring module, receive the gift object which is broadcasted based on the gift-giving request. Therefore, when the user gives gifts by himself, the user's own terminal can receive the gift object triggered by the user's own giving behavior more quickly and safely, and can be displayed on the user's own terminal faster, and the user experience can be improved.

Embodiment 1

Figure 5:
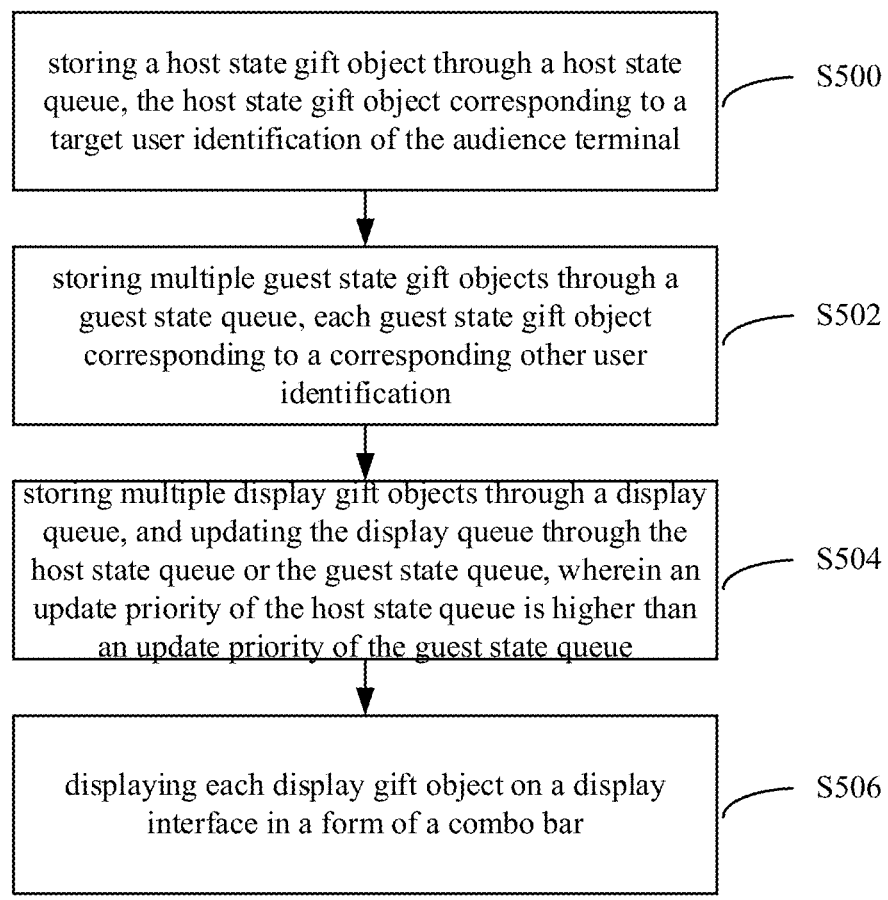
FIG. 5 schematically shows a flowchart of a gift display method in a web-based live broadcast according to a first embodiment of the present application.

FIG. 5 schematically shows a flowchart of a gift display method in a web-based live broadcast according to a first embodiment of the present application. It can be understood that the embodiment of the method can be executed in an audience terminal, and the flowchart of the embodiment of the method is not used to limit the sequence of execution steps. For convenience of explanation, the audience terminal 4A is a single execution subject of the method below.

As shown in FIG. 5, the gift display method in a web-based live broadcast may include steps S500 to S506, wherein:

Step S500, storing a host state gift object through a host state queue, the host state gift object corresponding to a target user identification of the audience terminal 4A.

Step S502, storing multiple guest state gift objects through a guest state queue, each guest state gift object corresponding to a corresponding other user identification.

Step S504, storing multiple display gift objects through a display queue, and updating the display queue through the host state queue or the guest state queue, wherein an update priority of the host state queue is higher than an update priority of the guest state queue.

Step S506, displaying each display gift object on a display interface in a form of a combo bar.

The host state gift object corresponds to a gift message triggered by the target user's own gift-giving behavior. In the embodiment, the host state queue can only store one host state gift object, otherwise, the display interface will be overwhelmed by a plurality of host state combo bars triggered by the target user herself/himself, thereby reducing interactive efficiency of the display interface.

The guest state gift object corresponds to a gift message triggered by a gift-giving behavior of other users.

The display gift object is from the host state gift object of the host state queue or the guest state gift object of the guest state queue.

When there is an out-of-queue display gift object in the display queue, it means that the display queue can add a new gift object. At this time, in order to ensure that the target user's own gift or combo bar based on the gift can be displayed quickly on the display interface, when the host state queue stores the host state gift object and the guest state queue stores the object state gift object, the host state gift object is preferentially added to the display queue as a new display gift object.

The gift display method in a web-based live broadcast described in the embodiment of the present application has the following technical advantages:

(1) A major difficulty of combo bars is that a number of positions for displaying combo bars at the same time is limit (for example, up to 3), however, in peak periods, tens of thousands of users in some live broadcast rooms may be giving gifts to anchors at the same time, thus tens of thousands of different combo bars are triggered.

The embodiment aims to perform hierarchical management through three-level buffer queues (the host state queue, the guest state queue, and the display queue) when a large number of gift messages flood in, to ensure that the large number of gift messages are efficiently managed, and the combo bar corresponding to each gift message is reasonably displayed on the display interface.

(2) The embodiment adopts the three-level buffer queue (the host state queue, the guest state queue, and the display queue) to maintain a combo bar buffer pool to be displayed, so that the large influx of gift messages will not be easily discarded and not displayed.

Figure 6:
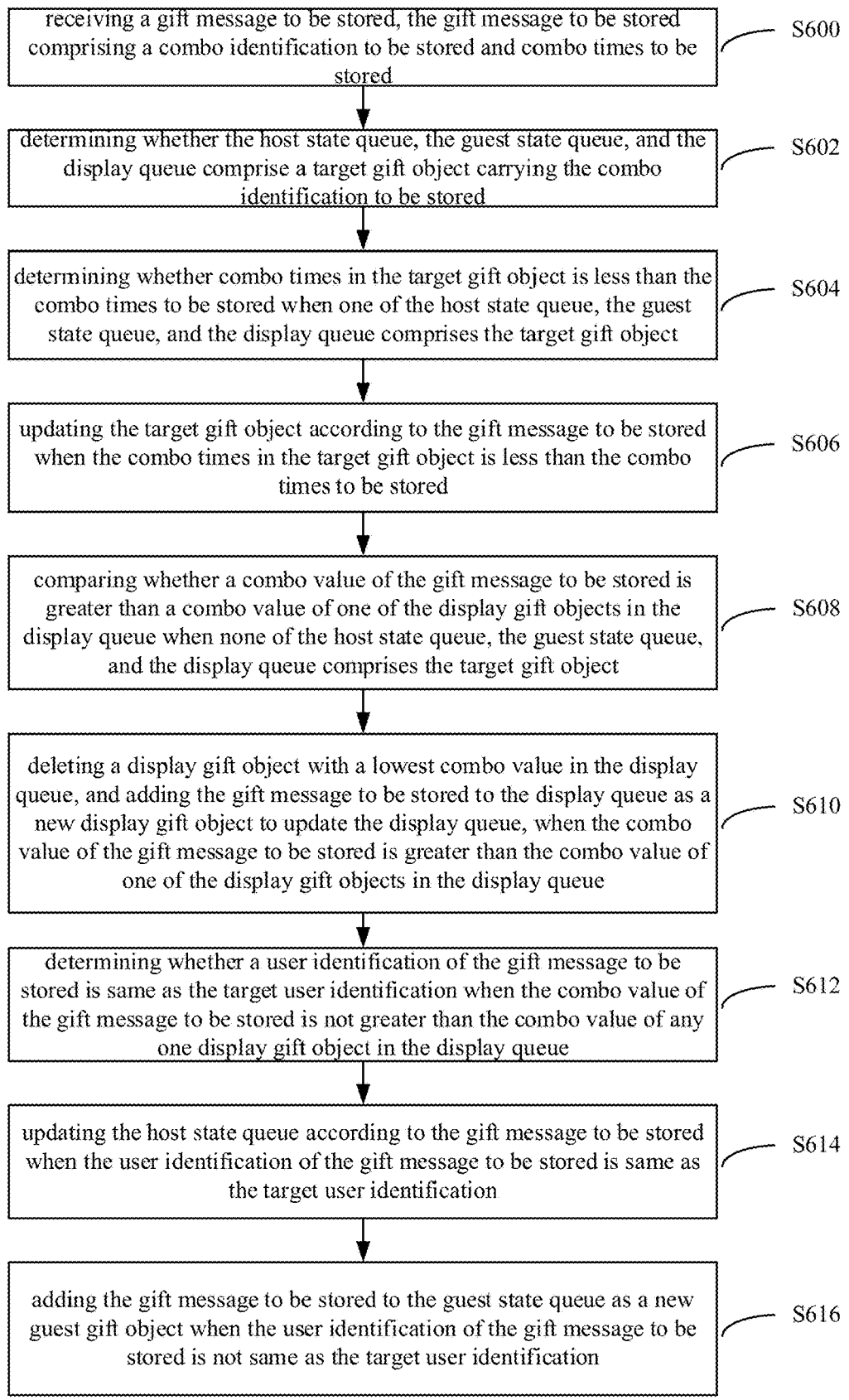
FIG. 6 schematically shows a flowchart of newly added steps of a gift display method in a web-based live broadcast according to the first embodiment of the present application.

(3) Based on the three level buffer queue, the embodiment also supports real-time updating of the data of "the same gift-giving behavior" (e.g. combo times), so as to ensure that the latest gift message will not be lost during the animation execution of the combo bar. The details are as follows:

As shown in FIG. 6, the steps of real-time updating the data of "the same gift-giving behavior" are as follows: step S600, receiving a gift message to be stored, the gift message to be stored comprising a combo identification to be stored and combo times to be stored; step S602, determining whether the host state queue, the guest state queue, and the display queue comprise a target gift object carrying the combo identification to be stored; step S604, determining whether combo times in the target gift object is less than the combo times to be stored when one of the host state queue, the guest state queue, and the display queue comprises the target gift object; step S606, updating the target gift object according to the gift message to be stored when the combo times in the target gift object is less than the combo times to be stored. As an example, the server 8 broadcasts or provides a new gift message (Message A) to the audience terminal 4A through the gift-giving interface, and the Message A may carry combo_ID and other information (Combo_ID is configured to indicate that the user behavior generating the Message A and one or more previous behaviors are "the same gift-giving behavior", so as to trigger a combo). After receiving the Message A, the audience terminal 4A will traverse whether the target gift object carrying the Combo_ID is included in the host state queue, the guest state queue, and the display queue. If one of the host state queue, the guest state queue, and the display queue includes a target gift object A' carrying the Combo_ID, the target gift object A' needs to be updated. For example, the combo times (10 times) in the Message A is updated to the target gift object A', so as to realize the real-time and rapid update of the data of the "same gift-giving behavior". Of course, when the combo times in the Message A is 10 and the combo times in the target gift object A' is 11, it means that the Message A is an error message or invalid message, and therefore can be discarded.

Figure 7:
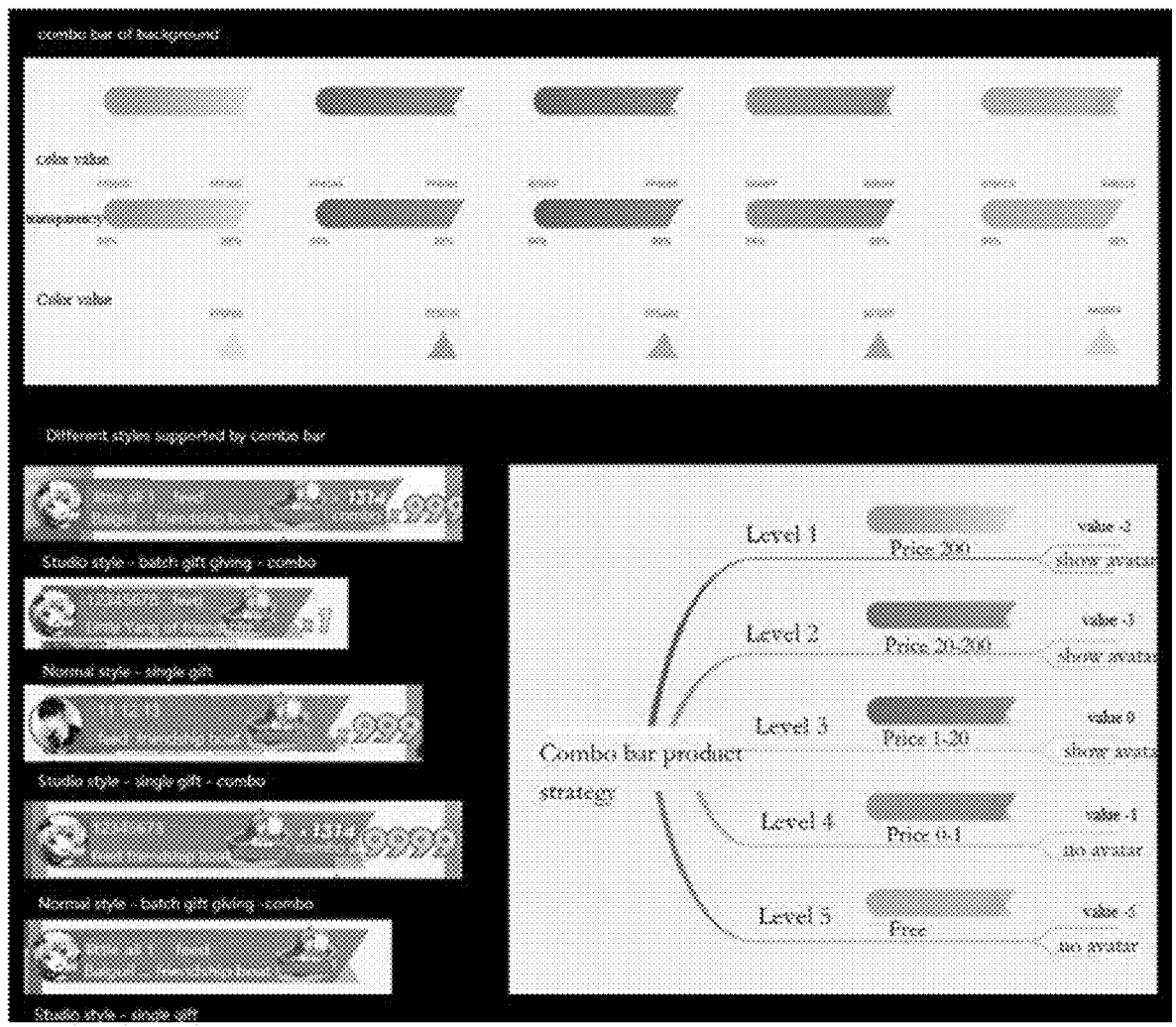
FIG. 7 schematically shows a schematic diagram of strategy formulation between combo bar price and combo bar special effect.

As shown in FIG. 6, in order to further enhance the interaction of the user's gift-giving support behavior, the combo bar display strategy can also be optimized and adjusted according to various factors such as gift-giving items to optimize the combo bar display in the display interface. As an example, the gift display method in a web-based live broadcast can also comprise: step S608, comparing whether a combo value of the gift message to be stored is greater than a combo value of one of the display gift objects in the display queue when none of the host state queue, the guest state queue, and the display queue comprises the target gift object; step S610, deleting a display gift object with a lowest combo value in the display queue, and adding the gift message to be stored to the display queue as a new display gift object to update the display queue, when the combo value of the gift message to be stored is greater than the combo value of one of the display gift objects in the display queue; step S612, determining whether a user identification of the gift message to be stored is same as the target user identification when the combo value of the gift message to be stored is not greater than the combo value of any one display gift object in the display queue; step S614, updating the host state queue according to the gift message to be stored when the user identification of the gift message to be stored is same as the target user identification; step S616, adding the gift message to be stored to the guest state queue as a new guest gift object when the user identification of the gift message to be stored is not same as the target user identification. The combo value may be a value of a gift or a prop or a value obtained by using the gift or the prop as a calculation factor. That is, a gift message containing a high-value gift identification may be preferentially added to the display queue, so that a corresponding combo bar is preferentially displayed. In order to further improve a visual difference, the display effect of combo bars corresponding to gift messages with different value identifications may also be different. As shown in FIG. 7, different combos can be configured according to prices of gifts or props. For example, when a user gives a gift with a price of 200 RMB multiple consecutive times, gift information of the user will appear on each terminal in a form of a combo bar carrying a user's avatar; when a user gives a gift with a price of 0 for multiple consecutive times, gift information of the user will appear on each terminal in a form of a combo bar without a user's avatar.

Figure 8:
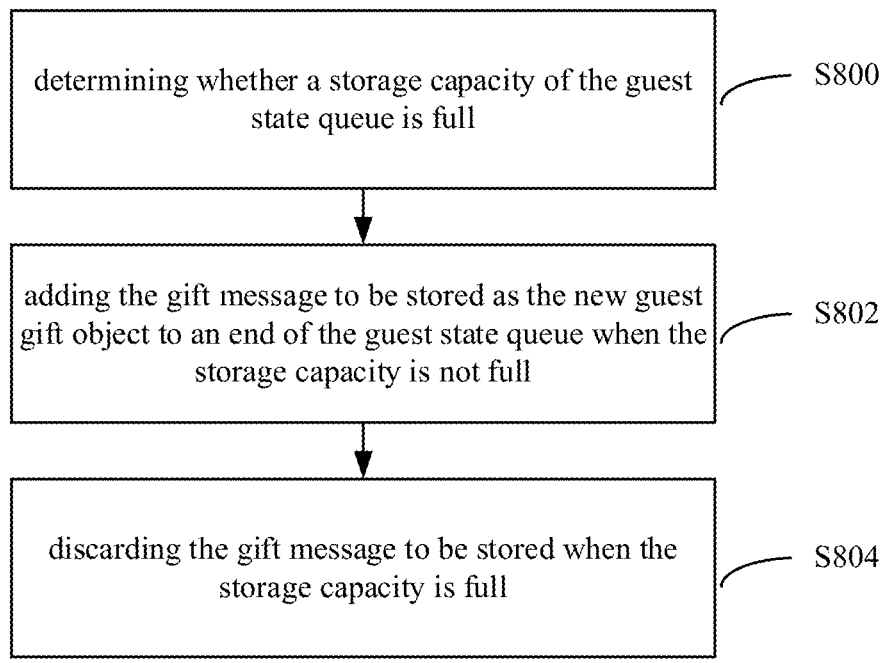
FIG. 8 schematically shows a flowchart of step S616 in FIG. 6.

As shown in FIG. 8, step S616 may comprise step S800-S804, wherein step S800, determining whether a storage capacity of the guest state queue is full; step S802, adding the gift message to be stored as the new guest gift object to an end of the guest state queue when the storage capacity is not full; step S804, discarding the gift message to be stored when the storage capacity is full. The embodiment is to prevent the memory from being over-occupied.

In an exemplary embodiment, the display interface may comprise one or more display combo bars in a display state, for example, three display combo bars as shown in FIG. 2.

The following will introduce the refresh, deletion, insertion, etc. of the display combo bar.

Figure 9:
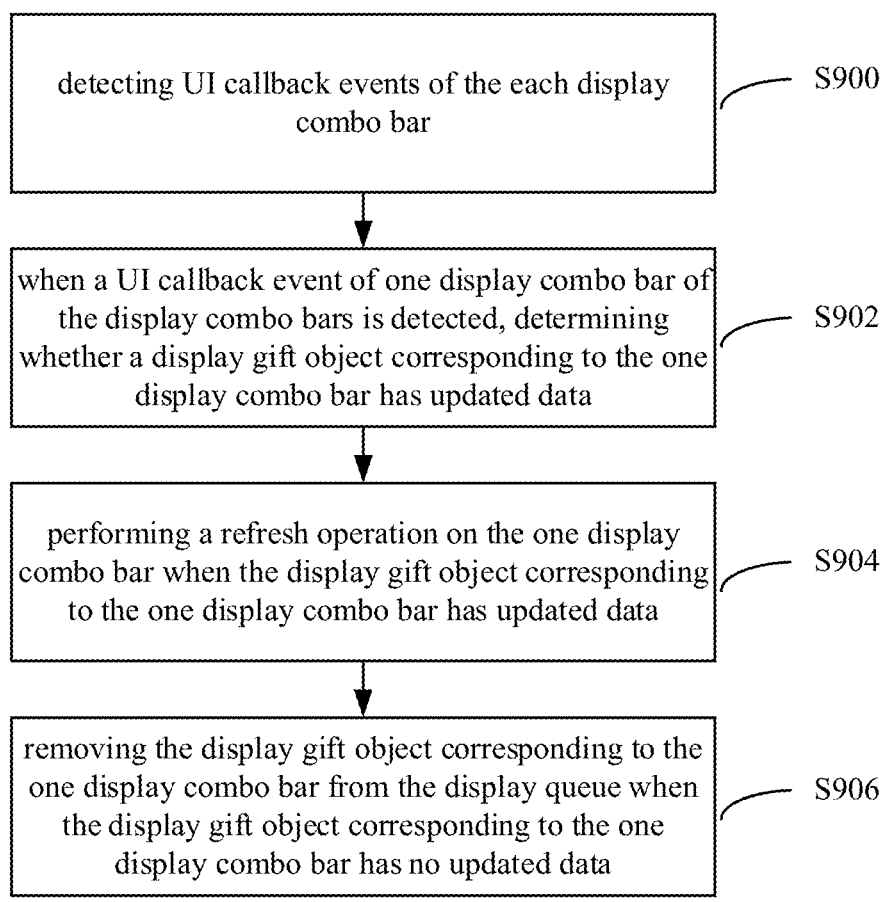
FIG. 9 schematically shows a flowchart of step S506 in FIG. 5.

In an exemplary embodiment, each display combo bar corresponds to a display gift object, as shown in FIG. 9, the step S506 can provide the following refresh mechanism through steps S900 to S906. Step S900, detecting UI callback events of the each display combo bar; step S902, when a UI callback event of one display combo bar of the display combo bars is detected, determining whether a display gift object corresponding to the one display combo bar has updated data; step S904, performing a refresh operation on the one display combo bar when the display gift object corresponding to the one display combo bar has updated data; step S906, removing the display gift object corresponding to the one display combo bar from the display queue when the display gift object corresponding to the one display combo bar has no updated data.

Figure 10:
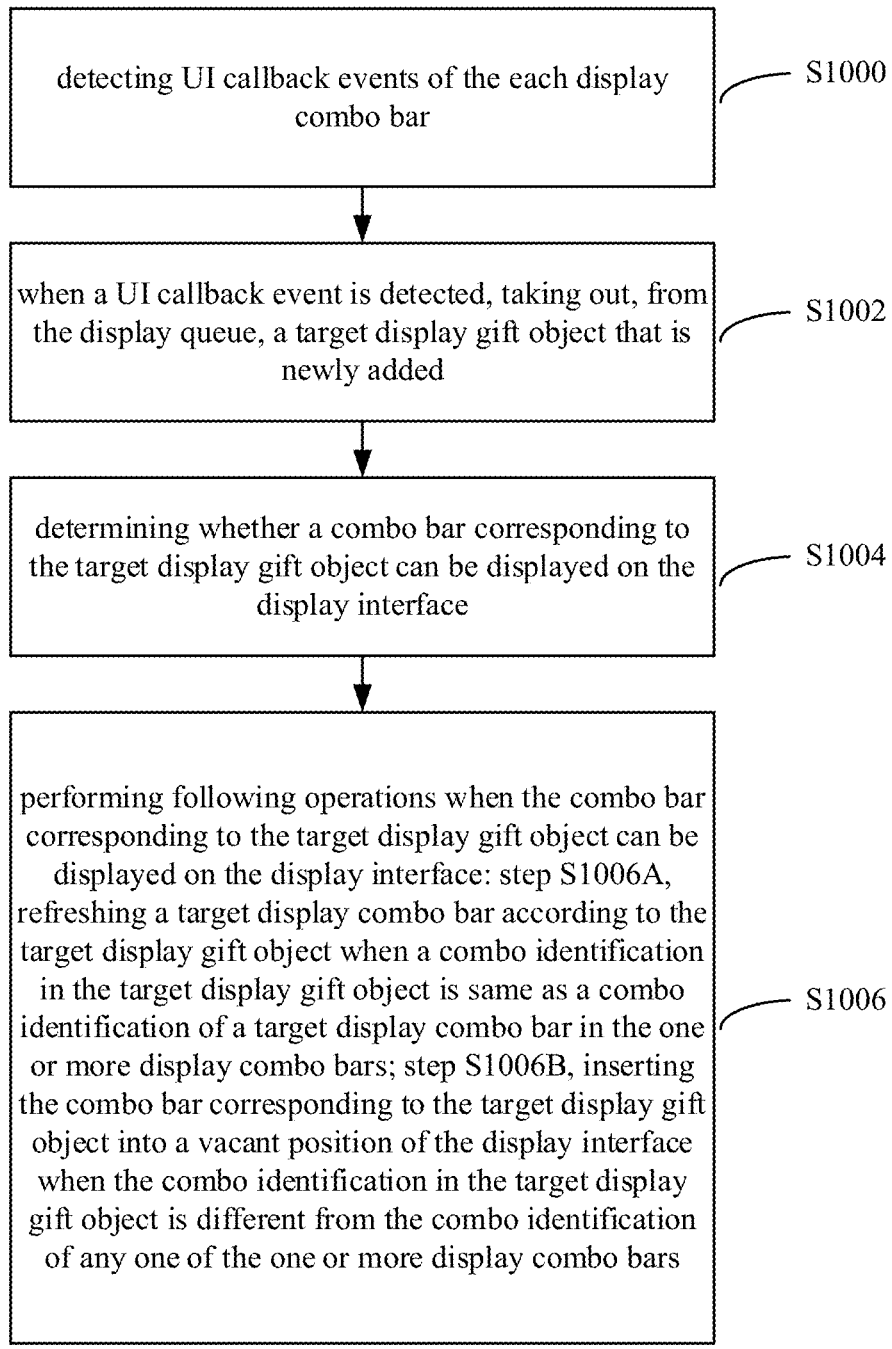
FIG. 10 schematically shows another flowchart of step S506 in FIG. 5.

In an exemplary embodiment, as shown in FIG. 10, step S506 can be implemented through steps S1000 to S1006, wherein: step S1000, detecting UI callback events of the each display combo bar; step S1002, when a UI callback event is detected, taking out, from the display queue, a target display gift object that is newly added; step S1004, determining whether a combo bar corresponding to the target display gift object can be displayed on the display interface; step S1006, performing following operations when the combo bar corresponding to the target display gift object can be displayed on the display interface: step S1006A, refreshing a target display combo bar according to the target display gift object when a combo identification in the target display gift object is same as a combo identification of a target display combo bar in the one or more display combo bars; step S1006B, inserting the combo bar corresponding to the target display gift object into a vacant position of the display interface when the combo identification in the target display gift object is different from the combo identification of any one of the one or more display combo bars. In the embodiment, when the combo identification in the target display gift object is same as the combo identification of the target display combo bar in the one or more display combo bars, it is not necessary to recreate and render a new combo bar, and only refresh a part of an area in the target display combo bar, such as an area for displaying the combo times, so as to save computing resources.

Figure 11:
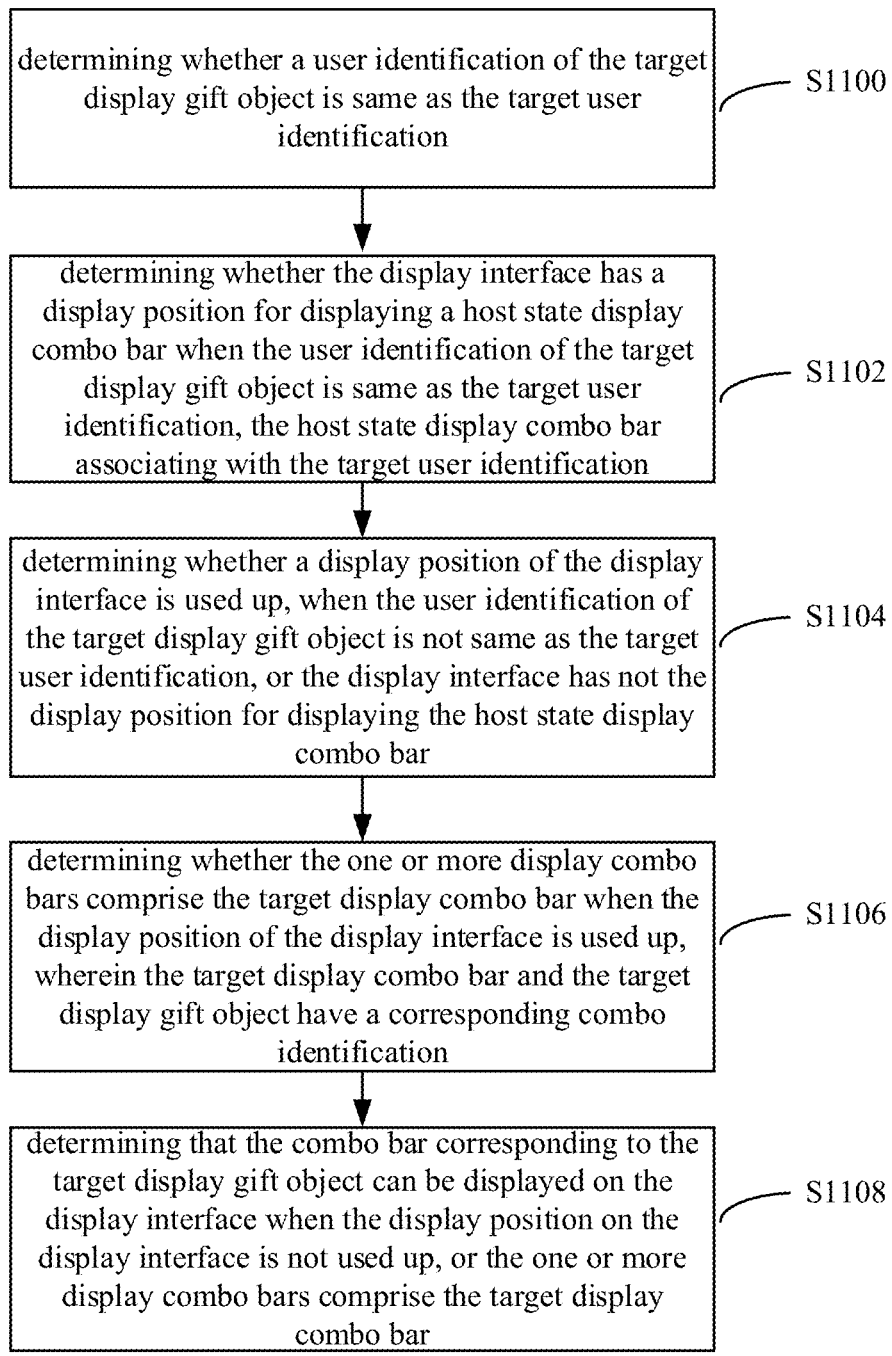
FIG. 11 schematically shows a flowchart of step S1004 in FIG. 10.

As shown in FIG. 11, step S1004 can be implemented through steps S1100 to S1108, wherein: step S1100, determining whether a user identification of the target display gift object is same as the target user identification; step S1102, determining whether the display interface has a display position for displaying a host state display combo bar when the user identification of the target display gift object is same as the target user identification, the host state display combo bar associating with the target user identification; step S1104, determining whether a display position of the display interface is used up, when the user identification of the target display gift object is not same as the target user identification, or the display interface has not the display position for displaying the host state display combo bar; step S1106, determining whether the one or more display combo bars comprise the target display combo bar when the display position of the display interface is used up, wherein the target display combo bar and the target display gift object have a corresponding combo identification; step S1108, determining that the combo bar corresponding to the target display gift object can be displayed on the display interface when the display position on the display interface is not used up, or the one or more display combo bars comprise the target display combo bar. When the user identification of the target display gift object is same as the target user identification, and there is a display position for displaying the host state display combo bar on the display interface, it is determined whether a display of the host state combo is completed, it is determined that the combo bar corresponding to the target display gift object can be displayed on the display interface when the display is completed, and it is determined that the combo bar corresponding to the target display gift object cannot be displayed on the display interface when the display is not completed. In the embodiment, whether the target display gift object can be displayed on the display interface is determined according to whether the target display gift object is a host state gift object or a guest state gift object and whether the current display interface displays a host state display combo bar. The advantage of the determination logic is to ensure that at most one combo bar triggered by the user herself/himself is displayed on the display interface, so that the combo bar triggered by the user herself/himself will not be overused, and then hinder the display of combo bars of other users. It can be seen that the embodiment ensures the interaction efficiency of the display interface.

Figure 12:
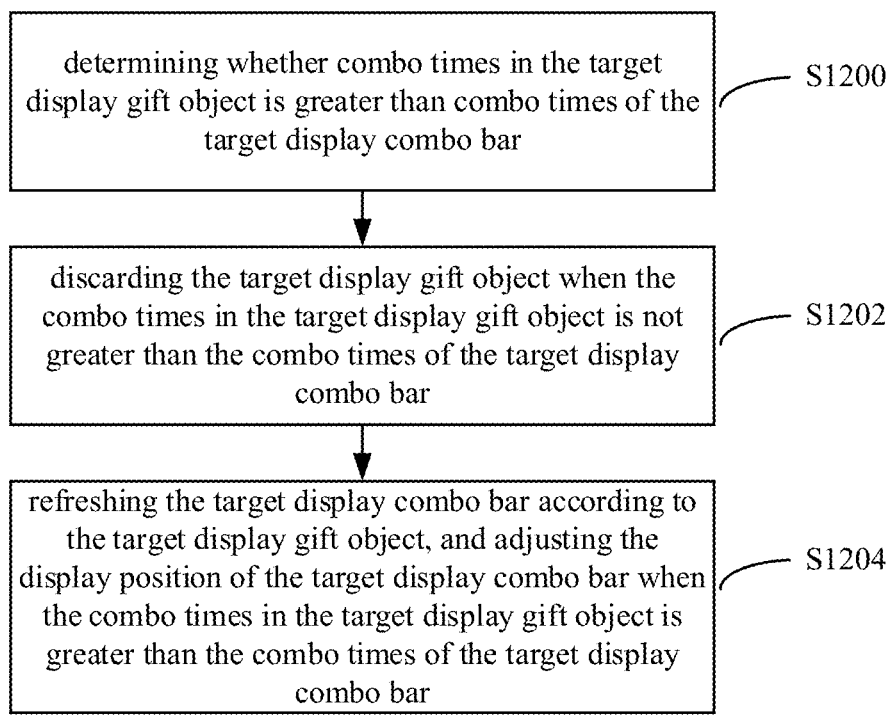
FIG. 12 schematically shows a flowchart of step S1006A in FIG. 10.

As shown in FIG. 12, step S1006A can be implemented through steps S1200 to S1204, wherein: step S1200, determining whether combo times in the target display gift object is greater than combo times of the target display combo bar; step S1202, discarding the target display gift object when the combo times in the target display gift object is not greater than the combo times of the target display combo bar; step S1204, refreshing the target display combo bar according to the target display gift object, and adjusting the display position of the target display combo bar when the combo times in the target display gift object is greater than the combo times of the target display combo bar. The embodiment aims to provide combo matching processing logic. When the combo times in the target display gift object are not greater than the combo times of the target display combo bar, it means that there is a data disorder (wrong message receiving order). Therefore, the target display gift object needs to be discarded to ensure the correctness and effectiveness of the display and save computing resources.

Figure 13A:
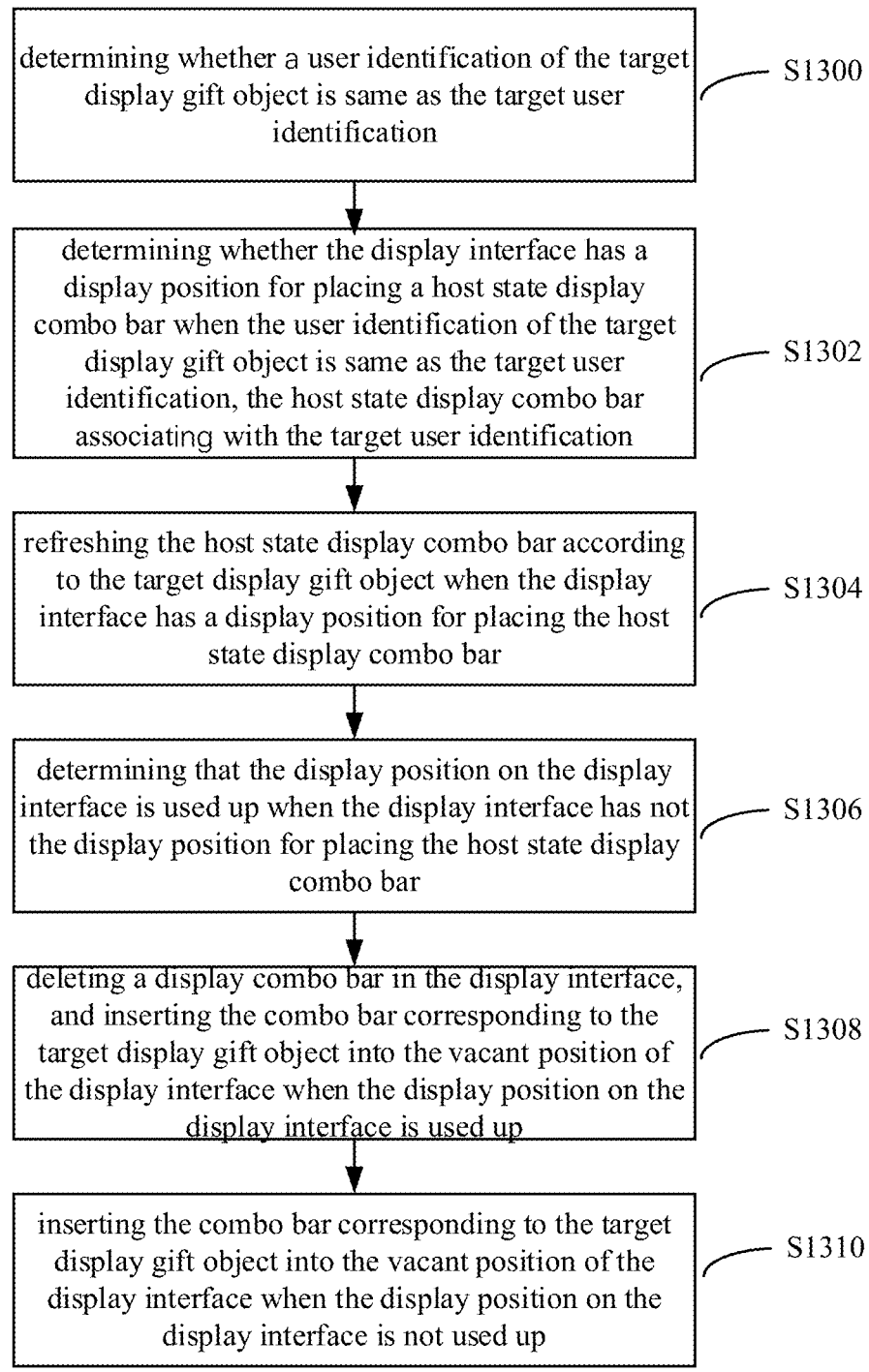
FIG. 13 (A)~(B) schematically show a flowchart of step S1006B in FIG. 10.

As shown in FIG. 13(A), step S1006B can be implemented through steps S1300 to S1310, wherein: step S1300, determining whether a user identification of the target display gift object is same as the target user identification; step S1302, determining whether the display interface has a display position for placing a host state display combo bar when the user identification of the target display gift object is same as the target user identification, the host state display combo bar associating with the target user identification; step S1304, refreshing the host state display combo bar according to the target display gift object when the display interface has a display position for placing the host state display combo bar; step S1306, determining that the display position on the display interface is used up when the display interface has not the display position for placing the host state display combo bar; step S1308, deleting a display combo bar in the display interface, and inserting the combo bar corresponding to the target display gift object into the vacant position of the display interface when the display position on the display interface is used up; step S1310, inserting the combo bar corresponding to the target display gift object into the vacant position of the display interface when the display position on the display interface is not used up. The embodiment aims to provide logic for a host state matching processing logic. When the display interface has a display position for placing the host state display combo bar and the host state display combo bar is displayed completely, the host state display combo bar is refreshed based on the target display gift object.

Figure 13B:
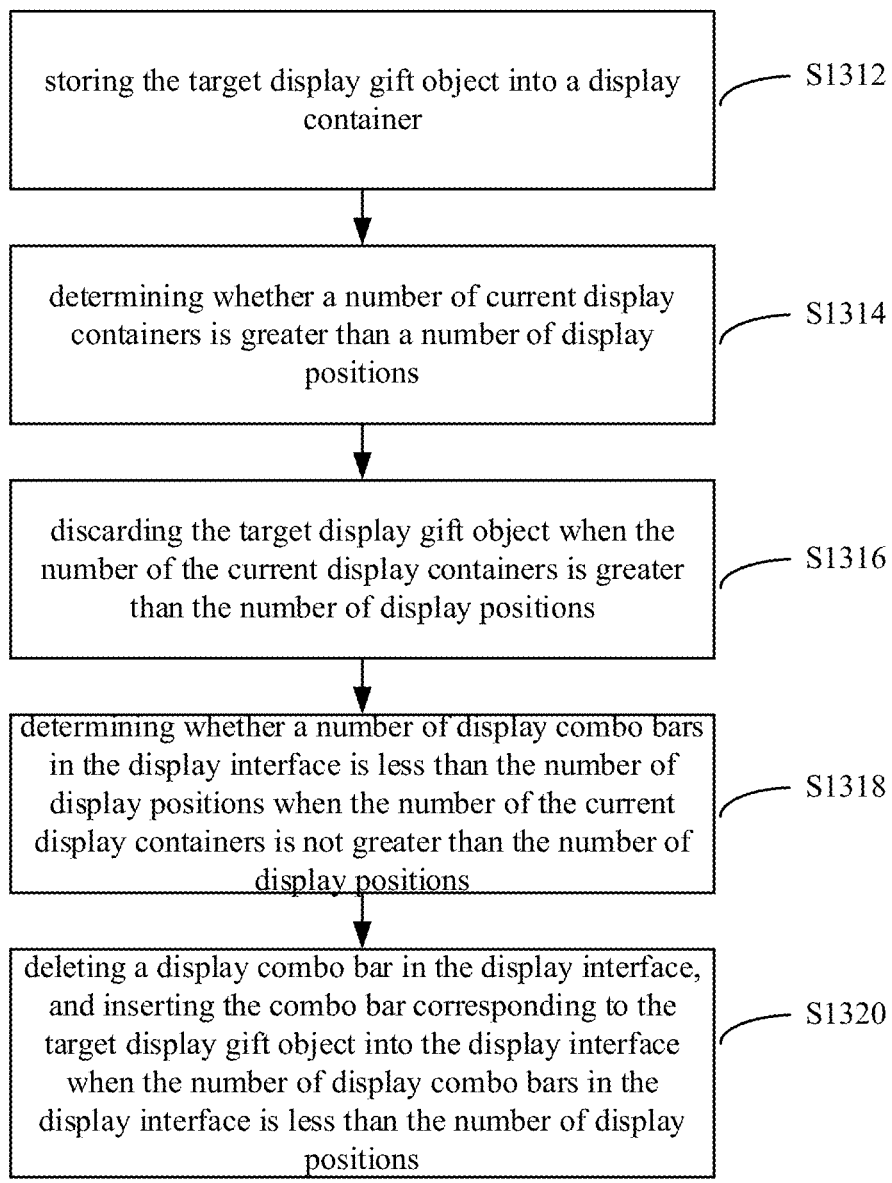

As shown in FIG. 13(B), when the user identification of the target display gift object is not same as the target user identification, the step S1006B further comprises step S1312-S1320, wherein: step S1312, storing the target display gift object into a display container; step S1314, determining whether a number of current display containers is greater than a number of display positions; step S1316, discarding the target display gift object when the number of the current display containers is greater than the number of display positions; step S1318, determining whether a number of display combo bars in the display interface is less than the number of display positions when the number of the current display containers is not greater than the number of display positions; step S1320, deleting a display combo bar in the display interface, and inserting the combo bar corresponding to the target display gift object into the display interface when the number of display combo bars in the display interface is less than the number of display positions. The embodiment aims to provide a minimum guarantee logic to prevent a number of containers from being greater than a number of display positions and avoid the display error of combo bars.

Figure 14:
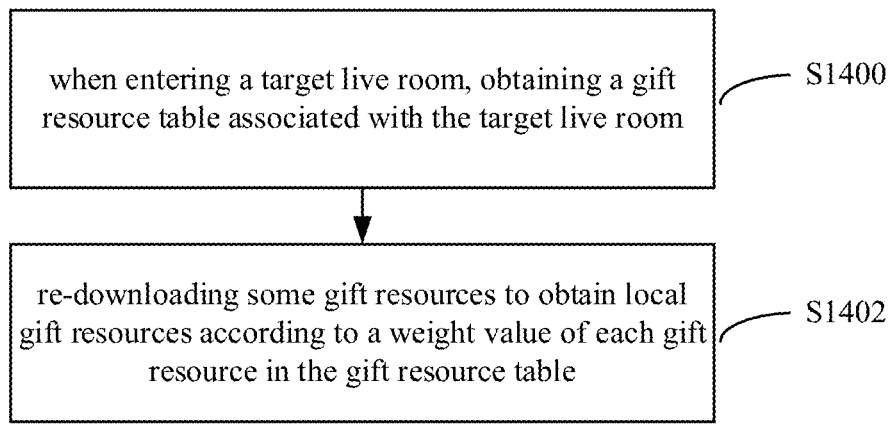
FIG. 14 schematically shows a flowchart of newly added steps of a gift display method in a web-based live broadcast according to the first embodiment of the present application.
Figure 15:
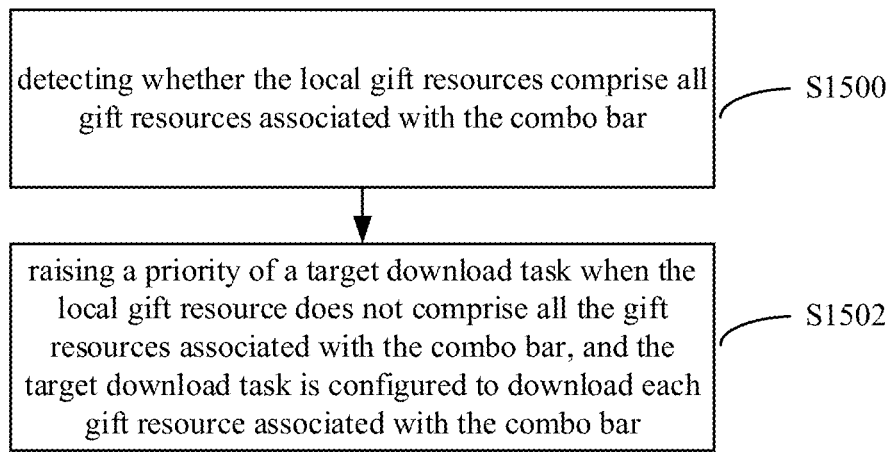
FIG. 15 schematically shows a flowchart of newly added steps of a gift display method in a web-based live broadcast according to the first embodiment of the present application.

Each combo bar includes multiple gift resources, wherein the multiple gift resources include at least one or more of the following: a gift animation image, a combo bar background image, a user avatar, and so on. In order to ensure timeliness and completeness of the display of combo bars, as shown in FIG. 14 and FIG. 15, the gift display method in the web-based live broadcast can preload resources through the following steps:

As shown in FIG. 14, the gift display method in the web-based live broadcast further comprises step S1400-S1402, wherein: step S1400, when entering a target live room, obtaining a gift resource table associated with the target live room; step S1402, pre-downloading some gift resources to obtain local gift resources according to a weight value of each gift resource in the gift resource table.

In an exemplary embodiment, when entering the target live broadcast room, the audience terminal 4A can also receive historical gift-giving information: starting from a time point of entering the said target live room, project forward a period of time, to get gift messages triggered by other users giving gifts in the target live room during this period of time (values of the gifts must meet a specified amount).

"Historical gift-giving information" is obtained to keep combo bar components as not vacant as possible. Therefore, after the audience terminal 4A enters the target live broadcast room, it can: respectively request "historical gift information" and request to obtain real-time gift information; after obtaining the historical gift information, when the local has received the real-time gift information, the historical gift will not be displayed.

As shown in FIG. 15, when a combo bar needs to be displayed, the gift display method in the web-based live broadcast further comprises step S1500-S1502, wherein: step S1500, detecting whether the local gift resources comprise all gift resources associated with the combo bar; step S1502, raising a priority of a target download task when the local gift resource does not comprise all the gift resources associated with the combo bar, and the target download task is configured to download each gift resource associated with the combo bar. The embodiment further ensures the timeliness and completeness of the display of combo bars.

Figure 16:
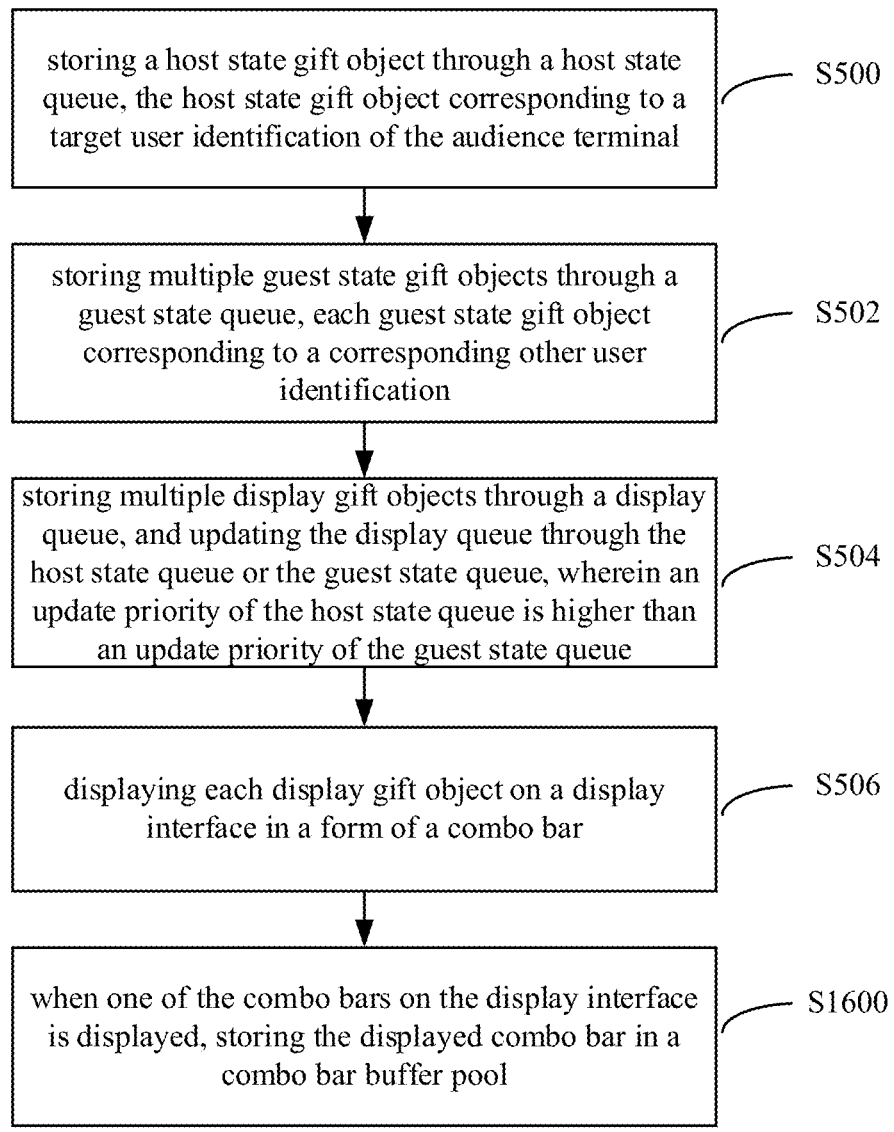
FIG. 16 schematically shows a flowchart of newly added steps of a gift display method in a web-based live broadcast according to the first embodiment of the present application.

In an exemplary embodiment, as shown in FIG. 16, the gift display method in the web-based live broadcast further comprises step S1600, when one of the combo bars on the display interface is displayed, storing the displayed combo bar in a combo bar buffer pool. The combo bar buffer pool is configured to store idle combo bars after use (the whole rendered combo bar). When a combo bar needs to be displayed, it is obtained from the combo bar buffer pool; when there is an idle combo bar, it is used directly without re-creating. This can reduce the consumption of excessive memory, CPU, and other resources by frequently creating a combo bar, and also reduce unnecessary time consumption, improve rendering effects, and reduce lag.

To make this application clearer and easier to understand, two examples are provided below. In the example, the maximum number of combo bars in the display interface is set to 3. It should be noted that the example is not used to limit the present application.

Figure 17:
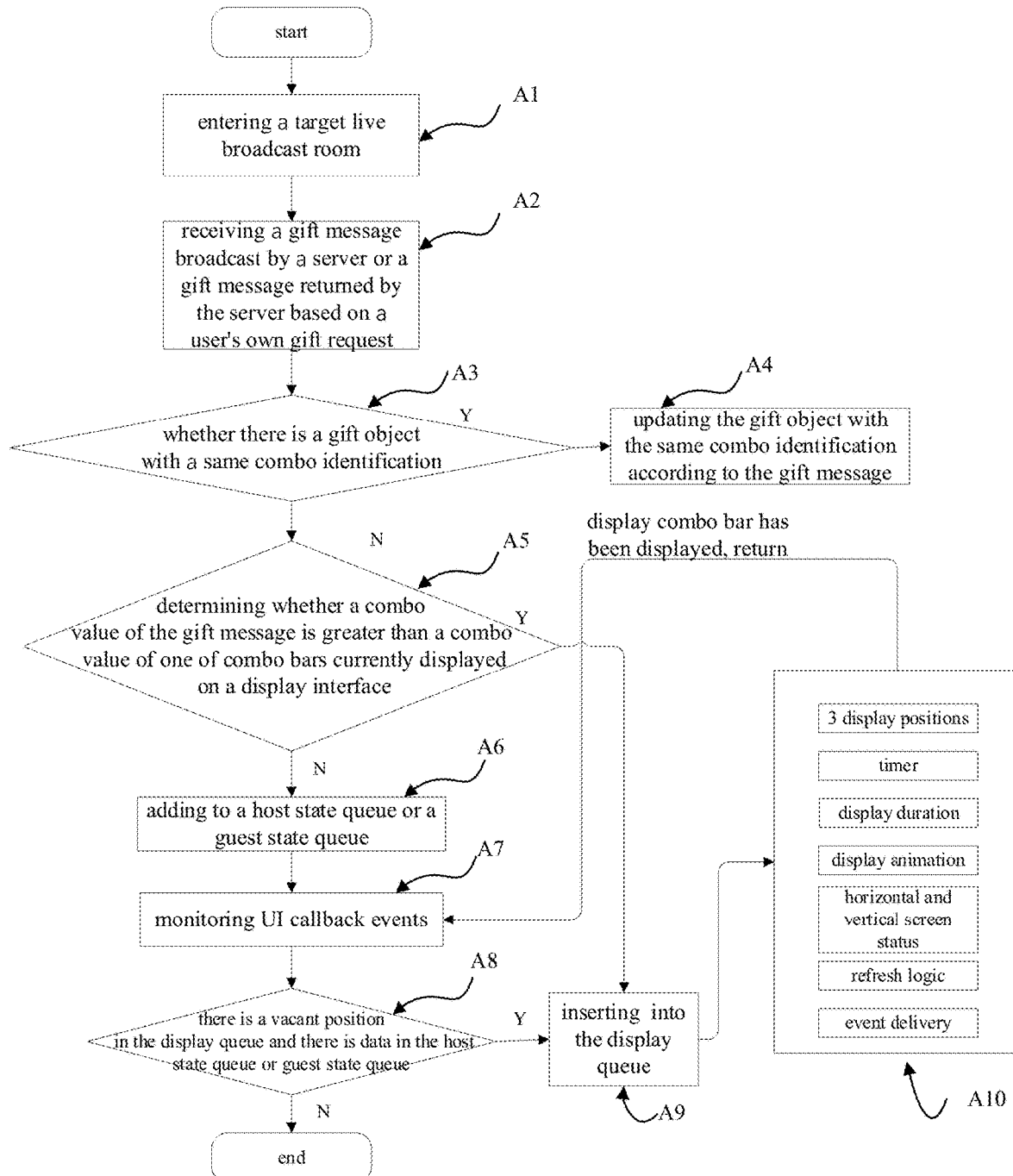
FIG. 17 schematically shows a combo bar display process 1.
Figure 18A:
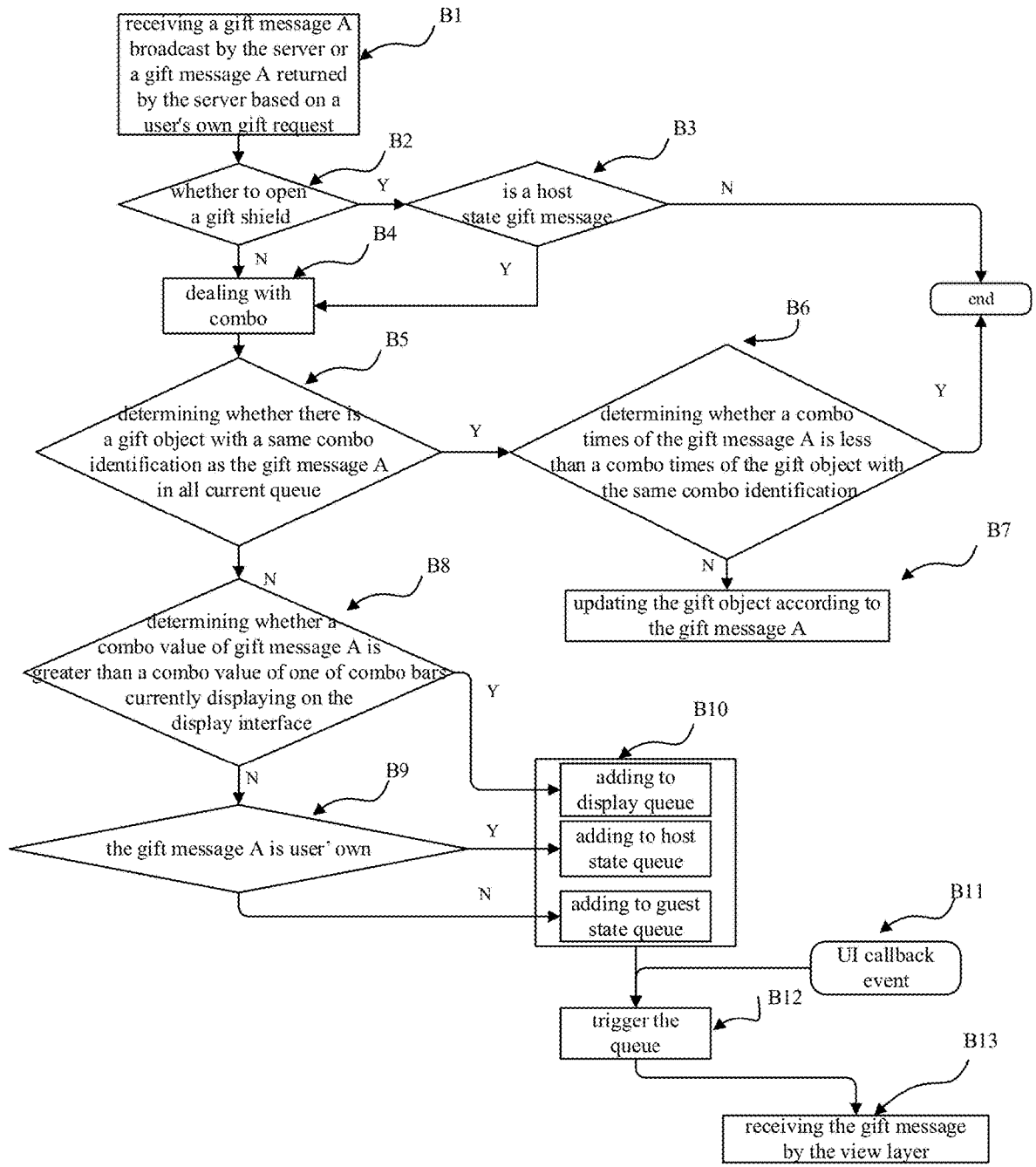
FIG. 18 (A)~(D) schematically show a combo bar display process 2.
Figure 18B:
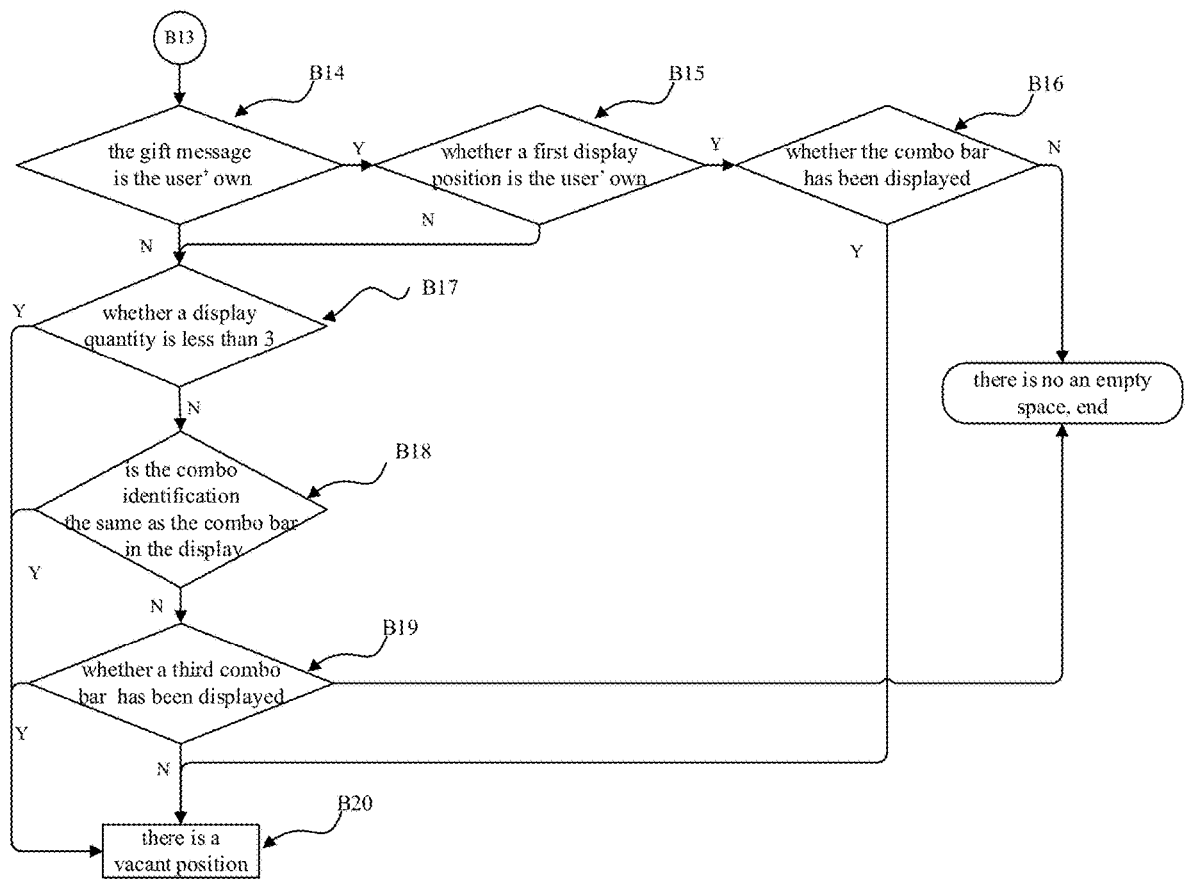
Figure 18C:
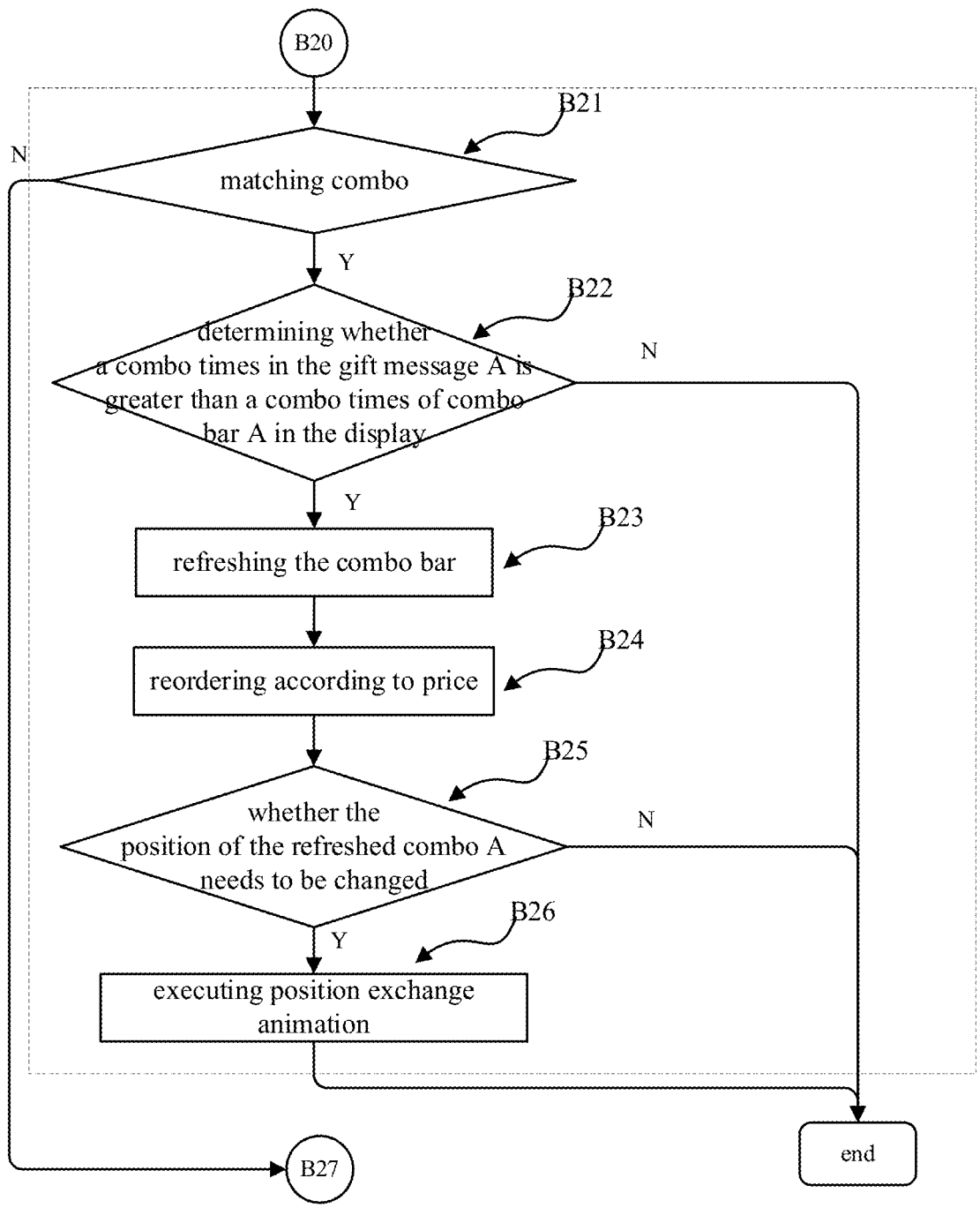
Figure 18D:
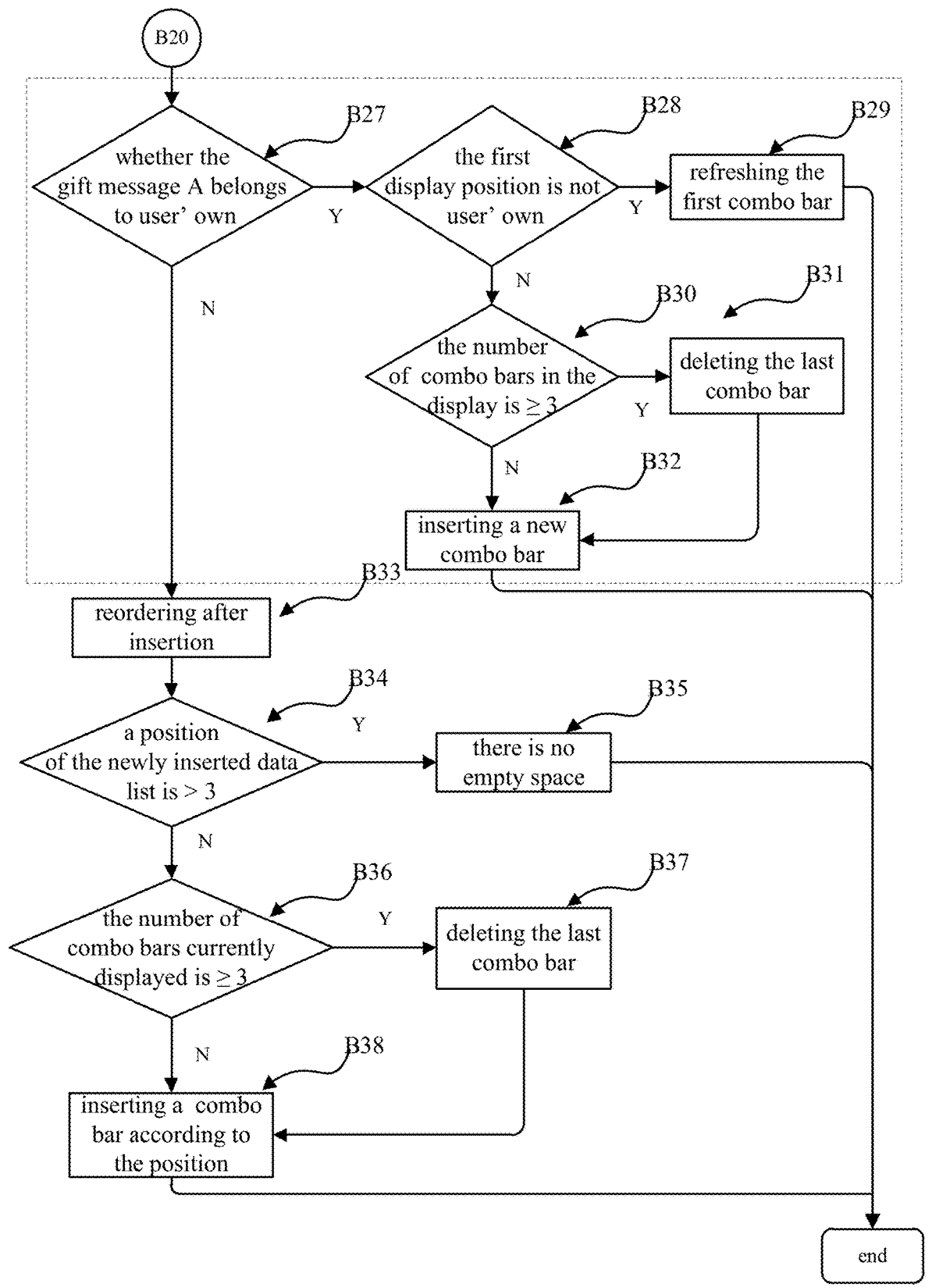

As shown in FIG. 17, combo bar display process 1:

A1: entering a target live broadcast room;

A2: receiving a gift message broadcast by a server or a gift message returned by the server based on a user's own gift request;

A3: whether there is a gift object with a same combo identification; if so, proceeding to step S4; otherwise, proceeding to step S5;

A4: updating the gift object with the same combo identification according to the gift message;

For example, information such as combo times in the gift message is updated to the gift object with the same combo identification;

A5: determining whether a combo value of the gift message is greater than a combo value of one of combo bars currently displayed on a display interface;

If yes, proceeding to step A9, removing a display gift object with a smallest combo value in a display queue, and inserting the gift message as a new display gift object into the display queue; if not, proceeding to step A6;

A6: adding the gift message to a host state queue or a guest state queue according to a user identification of the gift message;

A7: monitoring UI callback events;

Each time a combo bar is displayed in the display interface (for example, when the display time of the combo bar expires and an animation ends), a UI callback event will be triggered.

When the display gift object bound to the combo bar has a data update (e.g. the combo times are changed), the combo bar is refreshed on the display interface.

When the display gift object bound to the combo bar has no data update, the display gift object bound to the combo bar is removed from the display queue.

A8: determining whether there is a vacant position in the display queue and whether there is a gift object to be displayed in the host state queue or the guest state queue to be added to the display queue; if yes, proceeding to step A9; if not, end.

A9: inserting a gift object with a highest priority in the host state queue or the guest state queue into the display queue.

A10: refreshing or creating a corresponding combo bar according to the display gift object in the display queue.

The combo bar can carry a display duration, and can dynamically adjust the position and length according to a horizontal/vertical screen state.

As shown in FIG. 18(A)~(D), combo bar display process 2:

B1: receiving a gift message A broadcast by the server or a gift message A returned by the server based on a user's own gift request;

B2: whether to open a gift shield; if yes, proceeding to step B3; otherwise, proceeding to step B4;

B3: determining whether the gift message A is a host state gift message; if yes, proceeding to step B4, otherwise end;

B4: dealing with combo;

B5: determining whether there is a gift object with a same combo identification as the gift message Ain all current queues; if yes, proceeding to step B6; otherwise, proceeding to step B8;

B6: determining whether combo times of the gift message A is less than combo times of the gift object with the same combo identification; if yes, discarding the gift message A; otherwise, proceeding to step B7;

B7: updating the gift object according to the gift message A;

B8: determining whether a combo value of gift message A is greater than a combo value of one of combo bars currently displaying on the display interface; if yes, proceeding to step B10 and adding the gift message A to a display queue to replace a display gift object with a smallest combo value in the display queue; otherwise, proceeding to step B9;

B9: determining whether the gift message A is user' own; if yes, proceeding to step B10 and replacing a host state gift object in a host state queue with the gift message A; otherwise, proceeding to step B10 and adding the gift message A to a guest state queue;

B10: adding the gift message to the queue;

B11: monitoring a UI callback event returned by a view layer and notifying that a current display interface has a combo bar that has been displayed;

B12: trigger out of the queue when the UI callback event is monitored, and taking the gift message A that is newly added from the display queue (in the exemplary process, it is assumed that the gift message A is newly added to the display queue);

B13: receiving the gift message A by the view layer;

B14: determining whether the gift message A is the user' own, that is, whether a user identification in the gift message A is a target user identification; if yes, proceeding to B15, otherwise proceeding to step B17;

B15: determining whether a first display position is user' own, that is, determining whether the first display position is a combo bar for displaying the user' own gifts through the user identification of a combo bar of the first display position; if yes, proceeding to step B16, otherwise proceeding to step B20;

B16: determining whether the combo bar of the first display position has been displayed; If yes, proceeding step B20; otherwise, there is no vacant position and the process is ended;

B17: determining whether a display quantity is less than 3, that is, whether combo bars on the current display interface is less than 3; if yes, proceeding to step B20, otherwise proceeding to step B19;

B18: determining whether a combo identification combo_ID of the gift message A is same as a Combo_ID of one of combo bars being displayed on the current display interface; if yes, proceeding to step B20, otherwise, proceeding to step B19;

B19: determining whether a third combo bar has been displayed; if yes, proceeding to step B20, otherwise there is not a vacant position and the process is ended;

B20: determining that there is a vacant position for displaying a combo bar corresponding to gift message A;

B21: determining whether the combo identification combo_ID of the gift message A is same as the Combo_ID of one of the combo bars being displayed on the current display interface; if yes, proceeding to step B20, otherwise, proceeding to step B27;

B22: determining whether combo times in the gift message A is greater than combo times of combo bar A (with the same identification combo_ID as the gift message A) in the display; if yes, proceeding to step B23, otherwise discarding the gift message A;

B23: refreshing the combo A, for example, updating combo times on combo A;

B24: reordering according to price, and evaluating a display value of the updated combo A repeatedly according to the gift message A. For example, the more combo times, the higher the display value;

B25: determining whether a position of the refreshed combo A needs to be changed. For example, determining whether to change the position according to a price ranking; if yes, proceeding to step B26, otherwise ending the process after the display;

B26: executing a position exchange animation to change the display position of the refreshed combo A on the display interface, and end the process after the display;

B27: determining whether the gift message A belongs to user' own, that is, whether the user identification in the gift message A is the target user identification; if yes, proceeding B28, otherwise proceeding step B33;

B28: determining whether the first display position is user' own, that is, determining whether the first display position is user' own gift combo bar through the user identification of the combo bar of the first display position; if yes, proceeding to step B29, otherwise ending the process;

B29: refreshing the first combo bar according to the gift message A;

B30: determining whether the number of combo bars in the display is >3; if yes, proceeding to step B31; otherwise, proceeding to step B32;

B31: deleting the last combo bar on the display interface and proceeding to step B32;

B32: inserting a new combo bar, that is, the combo bar corresponding to gift message A (corresponding to a host state combo bar here);

B33: inserting a new combo bar, that is, the combo bar corresponding to gift message A (corresponding to a guest state combo bar here);

B34: determining whether a position of the newly inserted data list is greater than 3; if yes, proceeding to step B35, otherwise proceeding to step B36;

B35: confirming that there is no vacant position and ending the process;

B36: determining whether the number of combo bars currently displayed is >3. If yes, proceeding to step B37; otherwise, proceeding to step B38;

B37: deleting the last combo bar and proceeding to step B38;

B38: inserting a new combo bar according to the position (corresponding to the guest state combo bar here).

Figure 19:
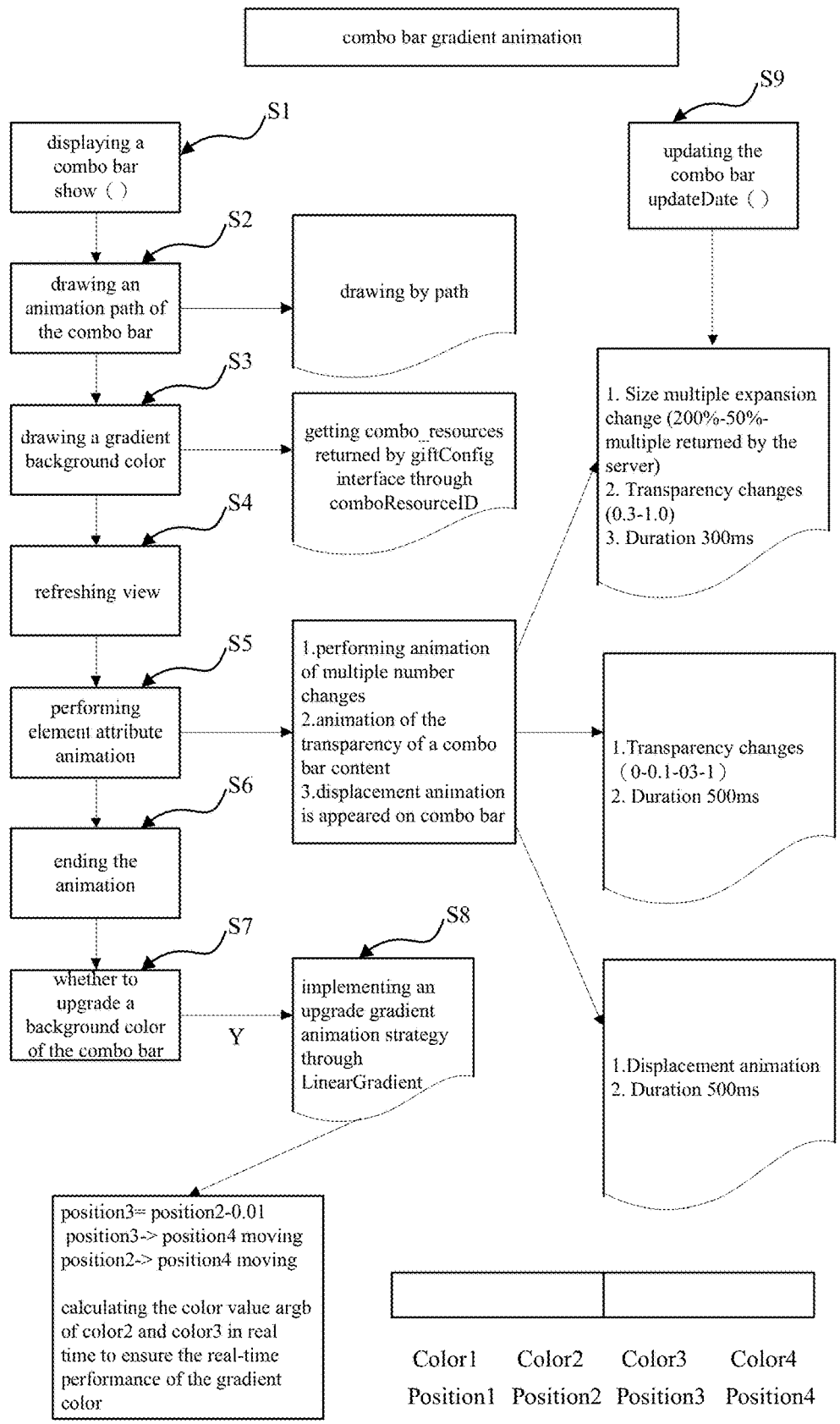
FIG. 19 schematically shows a logic diagram of a gradual change of the combo bar.

Next, as shown in FIG. 19, an exemplary combo bar gradient animation logic diagram is provided below.

S1: displaying a combo bar;
S2: drawing an animation path of the combo bar;
S3: getting combo_resources returned by giftConfig interface through comboResourceID (combo identification), and drawing a gradient background color;
S4: refreshing a window;
S5: performing element attribute animation;
Such as: 1. performing animation of multiple number changes; 2. animation of the transparency of a combo bar content; 3. displacement animation is appeared on combo bar;
S6: ending the animation;
S7: determining whether to upgrade a background color of the combo bar, if yes, proceeding to step S8; otherwise, do not operate;
S8: implementing an upgrade gradient animation strategy through LinearGradient;
Such as: position3=position2-0.01;
position3→position4 moving;
position2→position4 moving;
By calculating the color value argb of color2 and color3 in real-time to ensure the real-time performance of the gradient color;
S9: updating the combo bar.

Embodiment 2

Figure 20:
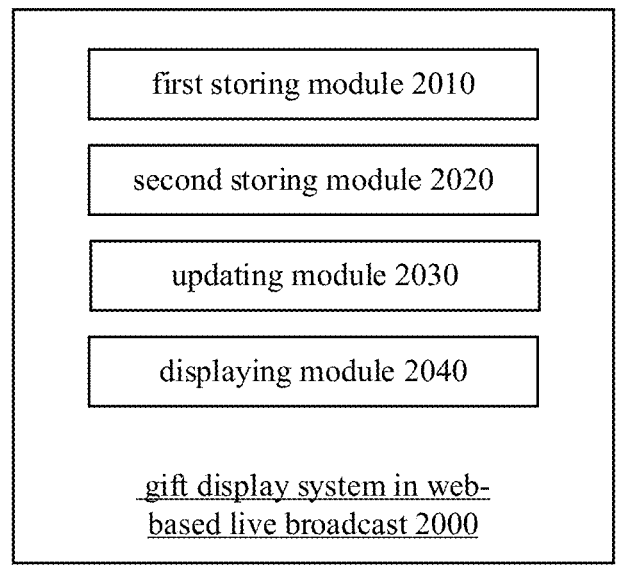
FIG. 20 schematically shows a block diagram of a gift display system in a web-based live broadcast according to a second embodiment of the present application.

FIG. 20 schematically shows a block diagram of a gift display system in a web-based live broadcast according to a second embodiment of the present application, and the gift display system in the web-based live broadcast may be divided into one or more program modules, which are stored in a medium, and executed by one or more processors to implement the embodiment of the present application. The program module referred to in the embodiment of the present application refers to a series of computer program instruction segments capable of accomplishing specific functions. The following description will specifically describe the functions of the program modules of the embodiment.

As shown in FIG. 20, the gift display system in the web-based live broadcast 2000 may comprise a first storing module 2010, a second storing module 2020, an updating module 2030, a displaying module 2040, wherein:

The first storing module 2010, storing a host state gift object through a host state queue, the host state gift object corresponding to a target user identification of the audience terminal;

The second storing module 2020, storing multiple guest state gift objects through a guest state queue, each guest state gift object corresponding to a corresponding other user identification;

The updating module 2030, storing multiple display gift objects through a display queue, and updating the display queue through the host state queue or the guest state queue, wherein an update priority of the host state queue is higher than an update priority of the guest state queue; and The displaying module 2040, displaying each display gift object on a display interface in a form of a combo bar.

In an exemplary embodiment, the gift display system 2000 may also comprise a message adding module, receiving a gift message to be stored, the gift message to be stored comprising a combo identification to be stored and combo times to be stored; determining whether the host state queue, the guest state queue, and the display queue comprise a target gift object carrying the combo identification to be stored; determining whether combo times in the target gift object is less than the combo times to be stored when one of the host state queue, the guest state queue, and the display queue comprises the target gift object; and updating the target gift object according to the gift message to be stored when the combo times in the target gift object is less than the combo times to be stored.

In an exemplary embodiment, the message adding module, further comparing whether a combo value of the gift message to be stored is greater than a combo value of one of the display gift objects in the display queue when none of the host state queue, the guest state queue, and the display queue comprises the target gift object; deleting a display gift object with a lowest combo value in the display queue, and adding the gift message to be stored to the display queue as a new display gift object to update the display queue, when the combo value of the gift message to be stored is greater than the combo value of one of the display gift objects in the display queue; determining whether a user identification of the gift message to be stored is same as the target user identification when the combo value of the gift message to be stored is not greater than the combo value of any one display gift object in the display queue; updating the host state queue according to the gift message to be stored when the user identification of the gift message to be stored is same as the target user identification; adding the gift message to be stored to the guest state queue as a new guest gift object when the user identification of the gift message to be stored is not same as the target user identification.

In an exemplary embodiment, the message adding module, further determining whether a storage capacity of the guest state queue is full; adding the gift message to be stored as the new guest gift object to an end of the guest state queue when the storage capacity is not full; and discarding the gift message to be stored when the storage capacity is full.

In an exemplary embodiment, the display interface comprises one or more display combo bars in a display state, and each display combo bar corresponds to a display gift object. The displaying module, further detecting UI callback events of the each display combo bar; when a UI callback event of one display combo bar of the display combo bars is detected, determining whether a display gift object corresponding to the one display combo bar has updated data; performing a refresh operation on the one display combo bar when the display gift object corresponding to the one display combo bar has updated data; removing the display gift object corresponding to the one display combo bar from the display queue when the display gift object corresponding to the one display combo bar has no updated data.

In an exemplary embodiment, the display interface comprises one or more display combo bars in a display state. The displaying module, further detecting UI callback events of the each display combo bar; when a UI callback event is detected, taking out, from the display queue, a target display gift object that is newly added; determining whether a combo bar corresponding to the target display gift object can be displayed on the display interface; performing following operations when the combo bar corresponding to the target display gift object can be displayed on the display interface: refreshing a target display combo bar according to the target display gift object when a combo identification in the target display gift object is same as a combo identification of a target display combo bar in the one or more display combo bars; inserting the combo bar corresponding to the target display gift object into a vacant position of the display interface when the combo identification in the target display gift object is different from the combo identification of any one of the one or more display combo bars.

In an exemplary embodiment, the displaying module 2040, further determining whether a user identification of the target display gift object is same as the target user identification; determining whether the display interface has a display position for displaying a host state display combo bar when the user identification of the target display gift object is same as the target user identification, the host state display combo bar associating with the target user identification; determining whether a display position of the display interface is used up, when the user identification of the target display gift object is not same as the target user identification, or the display interface has not the display position for displaying the host state display combo bar; determining whether the one or more display combo bars comprise the target display combo bar when the display position of the display interface is used up, wherein the target display combo bar and the target display gift object have a corresponding combo identification; and determining that the combo bar corresponding to the target display gift object can be displayed on the display interface when the display position on the display interface is not used up, or the one or more display combo bars comprise the target display combo bar.

In an exemplary embodiment, the displaying module 2040, further determining whether combo times in the target display gift object is greater than combo times of the target display combo bar; discarding the target display gift object when the combo times in the target display gift object is not greater than the combo times of the target display combo bar; refreshing the target display combo bar according to the target display gift object, and adjusting the display position of the target display combo bar when the combo times in the target display gift object is greater than the combo times of the target display combo bar.

In an exemplary embodiment, the displaying module 2040, further determining whether a user identification of the target display gift object is same as the target user identification; determining whether the display interface has a display position for placing a host state display combo bar when the user identification of the target display gift object is same as the target user identification, the host state display combo bar associating with the target user identification; refreshing the host state display combo bar according to the target display gift object when the display interface has a display position for placing the host state display combo bar; determining that the display position on the display interface is used up when the display interface has not the display position for placing the host state display combo bar; deleting a display combo bar in the display interface, and inserting the combo bar corresponding to the target display gift object into the vacant position of the display interface when the display position on the display interface is used up; inserting the combo bar corresponding to the target display gift object into the vacant position of the display interface when the display position on the display interface is not used up.

In an exemplary embodiment, the displaying module 2040, further performing following operations when the user identification of the target display gift object is not same as the target user identification: storing the target display gift object into a display container; determining whether a number of current display containers is greater than a number of display positions; discarding the target display gift object when the number of the current display containers is greater than the number of display positions; determining whether a number of display combo bars in the display interface is less than the number of display positions when the number of the current display containers is not greater than the number of display positions; deleting a display combo bar in the display interface, and inserting the combo bar corresponding to the target display gift object into the display interface when the number of display combo bars in the display interface is less than the number of display positions.

In an exemplary embodiment, the gift display system in the web-based live broadcast further comprises a pre-downloading module, when entering a target live room, obtaining a gift resource table associated with the target live room; and pre-downloading some gift resources to obtain local gift resources according to a weight value of each gift resource in the gift resource table.

In an exemplary embodiment, the pre-downloading module, further detecting whether the local gift resources comprise all gift resources associated with the combo bar; raising a priority of a target download task when the local gift resource does not comprise all the gift resources associated with the combo bar, and the target download task is configured to download each gift resource associated with the combo bar.

In an exemplary embodiment, the gift display system in the web-based live broadcast further comprises a pre-loading module, when one of the combo bars on the display interface is displayed, storing the displayed combo bar in a combo bar buffer pool.

Embodiment 3

Figure 21:
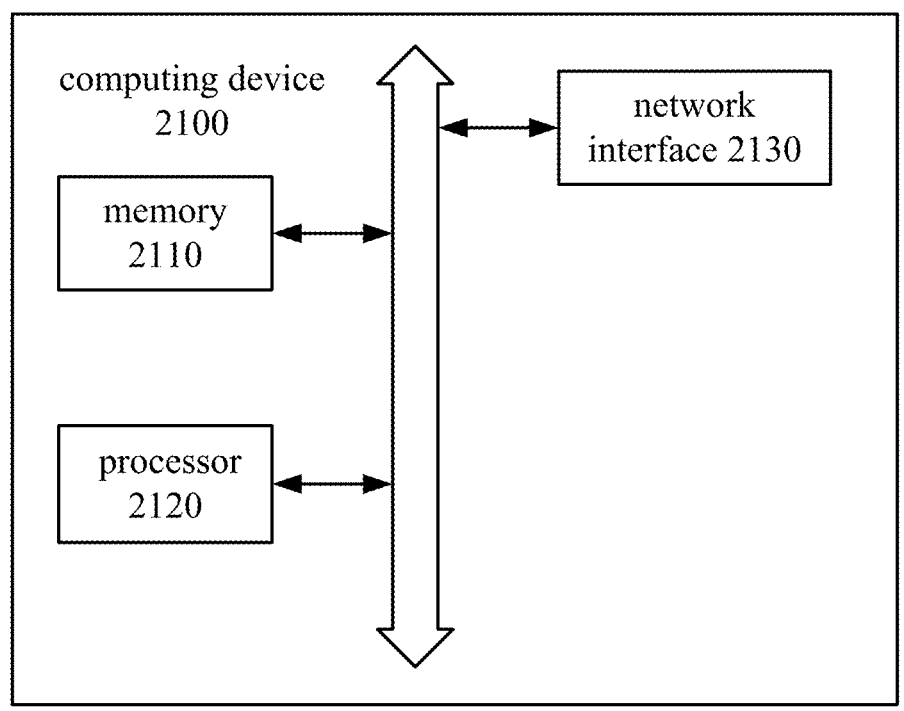
FIG. 21 schematically shows a schematic diagram of the hardware architecture of a computer device suitable for implementing a gift display method in a web-based live broadcast according to a third embodiment of the present application.

FIG. 21 schematically shows a schematic diagram of the hardware architecture of a computer device suitable for implementing a gift display method in a web-based live broadcast according to a third embodiment of the present application. The computing device 2100 can be used as audience terminals 4A, 4B, . . . , and can also be used as the anchor terminal 2. In the embodiment, the computing device 2100 is a device capable of automatically performing numerical calculations and/or information processing according to predefined or stored instructions. For example, it can be an electronic device with audio and video processing capabilities, such as a smartphone, a tablet computer, a notebook computer, and the like. As shown in FIG. 21, the computing device 2100 includes, but is not limited to, a memory 2110, a processor 2120, and a network interface 2130 that can be communicated with each other through a system bus. Of which:

The memory 2110 includes at least one type of computer-readable storage medium. The readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory 2110 may be an internal storage module of the computing device 2100 such as a hard disk or memory of the computing device 2100. In other embodiments, the memory 2110 may also be an external storage device of the computing device 2100, such as a plugged hard disk provided on the computing device 2100, a smart media card (SMC), secure digital (SD) card, a flash memory card, and the like. Of course, the memory 2110 may also include both an internal storage module and an external storage device of the computing device 2100. In the embodiment, the memory 2110 is generally configured to store an operating system and various types of application software installed in the computing device 2100 such as program codes of the network communication method and the like. In addition, the memory 2110 may also be configured to temporarily store various types of data that have been or will be outputted.

The processor 2120, in some embodiments, may be a central processing unit (CPU), a controller, a microprocessor, or other data processing chip. The processor 2120 is generally configured to control the overall operation of the computing device 2100 such as performing control and processing related to data interaction or communication with the computing device 2100. In the embodiment, the processor 2120 is configured to run program code stored in the memory 2110 or process data.

The network interface 2130 may include a wireless network interface or a wired network interface which is generally used to establish a communication connection between the computing device 2100 and other computing devices. For example, the network interface 2130 is used for connecting the computing device 2100 to an external terminal via a network and establishing a data transmission channel and a communication connection between the computing device 2100 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 21 shows only a computing device 2100 having components 2110-2130, but it is understood that it is not required to implement all of the shown components and that more or fewer parts can be implemented in lieu thereof.

In the embodiment, an interactive method of bullet screen eggs stored in the memory 2110 may be divided into one or more program modules and executed by one or more processors (processor 2120 in the embodiment) to complete the present application.

Embodiment 4

The embodiment further provides a computer-readable storage medium, which stores computer programs, and when the computer programs are executed by a processor, the steps of a gift display method in a web-based live broadcast in the embodiment are realized.

In the embodiment, the computer-readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the computer-readable storage medium may be an internal storage module of the computing device such as a hard disk or memory of the computing device. In other embodiments, the memory may also be an external storage device of the computing device, such as a plugged hard disk provided on the computing device, a smart media card (SMC), secure digital (SD) card, a flash memory card, and the like. Of course, the computer-readable storage medium may also include both an internal storage module and an external storage device of the computing device. In the embodiment, the computer-readable storage medium is generally used to store an operating system and various types of application software installed in the computing device such as program codes of the network communication method and the like. In addition, the memory may also be used to temporarily store various types of data that have been or will be outputted.

Embodiment 5

Figure 22:
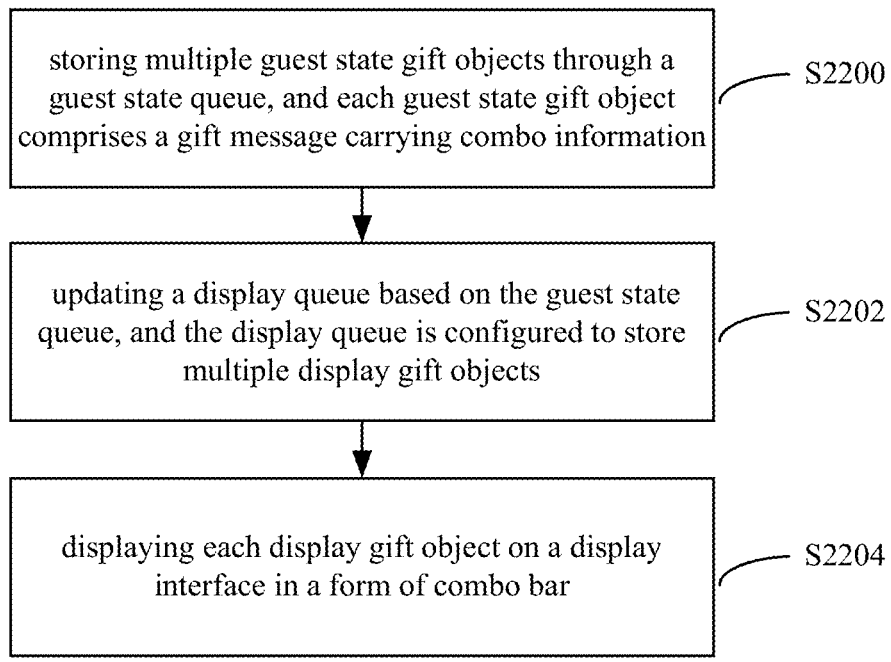
FIG. 22 schematically shows a flowchart of a gift display method in a web-based live broadcast according to a fifth embodiment of the present application.

FIG. 22 schematically shows a flowchart of a gift display method in a web-based live broadcast according to a fifth embodiment of the present application. It can be understood that the embodiment of the method can be executed in the anchor terminal 2, and the flowchart of the embodiment of the method is not used to limit the sequence of execution steps. Since the anchor terminal 2 does not support sending gifts to itself, there will be no host state queue, and the gifts cannot be displayed on the display interface. For the rest, please refer to the steps in the first embodiment.

Step S2200, storing multiple guest state gift objects through a guest state queue, and each guest state gift object comprises a gift message carrying combo information.

Step S2202, updating a display queue based on the guest state queue, and the display queue is configured to store multiple display gift objects.

Step S2204, displaying each display gift object on a display interface in a form of a combo bar.

As an example, the method can also comprise the following steps: receiving a gift message to be stored, wherein the gift message to be stored comprises a combo identification to be stored and combo times to be stored; determining whether the host state queue, the guest state queue, and the display queue comprise a target gift object carrying the combo identification to be stored; determining whether combo times in the target gift object is less than the combo times to be stored when one of the host state queue, the guest state queue, and the display queue comprises the target gift object; and updating the target gift object according to the gift message to be stored when the combo times in the target gift object is less than the combo times to be stored.

As an example, the method can also comprise the following steps: comparing whether a combo value of the gift message to be stored is greater than a combo value of one of the display gift objects in the display queue when none of the host state queue, the guest state queue, and the display queue comprises the target gift object; deleting a display gift object with the lowest combo value in the display queue, and adding the gift message to be stored to the display queue as a new display gift object to update the display queue, when the combo value of the gift message to be stored is greater than the combo value of one of the display gift objects in the display queue; determining whether a user identification of the gift message to be stored is same as the target user identification when the combo value of the gift message to be stored is not greater than the combo value of any one display gift object in the display queue; updating the host state queue according to the gift message to be stored when the user identification of the gift message to be stored is same as the target user identification; adding the gift message to be stored to the guest state queue as a new guest gift object when the user identification of the gift message to be stored is not same as the target user identification.

As an example, the method can also comprise the following steps: determining whether a storage capacity of the guest state queue is full; adding the gift message to be stored as a new guest gift object to the end of the guest state queue when the storage capacity is not full; and discarding the gift message to be stored when the storage capacity is full.

As an example, the display interface comprises one or more display combo bars in a display state, and each display combo bar corresponds to a display gift object; and the displaying each display gift object on a display interface in a form of a combo bar, comprises: detecting UI callback events of the each display combo bar; when a UI callback event of one of the display combo bars is detected, determining whether a display gift object corresponding to the display combo bar has updated data; performing a refresh operation on the display combo bar when the display gift object corresponding to the display combo bar has updated data; removing the display gift object corresponding to the display combo bar from the display queue when the display gift object corresponding to the display combo bar has no updated data.

As an example, the display interface comprises one or more display combo bars in a display state; and the displaying each display gift object on a display interface in a form of a combo bar, comprises: detecting UI callback events of the each display combo bar; taking out a newly added target display gift object from the display queue when a UI callback event is detected; determining whether a combo bar corresponding to the target display gift object can be displayed on the display interface; performing the following operations when the combo bar corresponding to the target display gift object can be displayed on the display interface: refreshing the target display combo bar according to the target display gift object when a combo identification in the target display gift object is same as a combo identification of the target display combo bar in the one or more display combo bars; inserting the combo bar corresponding to the target display gift object into an vacant position of the display interface when the combo identification in the target display gift object is different from the combo identification of any one of the one or more display combo bars.

As an example, the determining whether a combo bar corresponding to the target display gift object can be displayed on the display interface, comprises: determining whether the user identification of the target display gift object is same as the target user identification; determining whether the display interface has a display position for displaying a host state display combo bar when the user identification of the target display gift object is same as the target user identification, and the host state display combo bar is associated with the target user identification; determining whether the display position of the display interface is used up when the user identification of the target display gift object is not same as the target user identification, or the display interface has not the display position for displaying the host state display combo bar; determining whether the one or more display combo bars comprise the target display combo bar when the display position of the display interface is used up, and the target display combo bar and the target display gift object have corresponding combo identification; and determining that the combo bar corresponding to the target display gift object can be displayed on the display interface when the display position on the display interface is not used up, or the one or more display combo bars comprise the target display combo bar.

As an example, the refreshing the target display combo bar according to the target display gift object when a combo identification in the target display gift object is same as a combo identification of the target display combo bar in the one or more display combo bars, comprises: determining whether combo times in the target display gift object is greater than combo times of the target display combo bar; discarding the target display gift object when the combo times in the target display gift object is not greater than the combo times of the target display combo bar; refreshing the target display combo bar according to the target display gift object, and adjusting the display position of the target display combo bar when the combo times in the target display gift object is greater than the combo times of the target display combo bar.

As an example, the inserting the combo bar corresponding to the target display gift object into a vacant position of the display interface when the combo identification in the target display gift object is different from the combo identification of any one of the one or more display combo bars, comprises: determining whether the user identification of the target display gift object is same as the target user identification; determining whether the display interface has a display position for placing a host state display combo bar when the user identification of the target display gift object is same as the target user identification, and the host state display combo bar is associated with the target user identification; refreshing the host state display combo bar according to the target display gift object when the display interface has a display position for placing the host state display combo bar; determining that the display position on the display interface is used up when the display interface has not a display position for placing the host state display combo bar; deleting a display combo bar in the display interface, and inserting a combo bar corresponding to the target display gift object into an vacant position of the display interface when the display position on the display interface is used up; inserting the combo bar corresponding to the target display gift object into an vacant position of the display interface when the display position on the display interface is not used up.

As an example, the inserting the combo bar corresponding to the target display gift object into a vacant position of the display interface when the combo identification in the target display gift object is different from the combo identification of any one of the one or more display combo bars, further comprises: performing the following operations when the user identification of the target display gift object is not same as the target user identification: storing the target display gift object into a display container; determining whether a number of current display containers is greater than a number of display positions; discarding the target display gift object when the number of the current display containers is greater than the number of display positions; determining whether the number of display combo bars in the display interface is less than the number of display positions when the number of the current display containers is not greater than the number of display positions; deleting a display combo bar in the display interface, and inserting the combo bar corresponding to the target display gift object into the display interface when the number of display combo bars in the display interface is less than the number of display positions.

As an example, the method can also comprise: when entering a target live room, obtaining a gift resource table associated with the target live room; and pre-downloading some gift resources to obtain local gift resources according to a weight value of each gift resource in the gift resource table.

As an example, when a combo bar needs to be displayed, the method further comprises: detecting whether the local gift resources comprise all gift resources associated with the combo bar; raising a priority of a target download task when the local gift resource does not comprise all the gift resources associated with the combo bar, and the target download task is configured to download each gift resource associated with the combo bar.

As an example, the method can also comprise: when one of the combo bars on the display interface is displayed, storing the displayed combo bar in a combo bar buffer pool.

Apparently, it should be appreciated by those skilled in the art that each module or step described in the embodiment of the present application can be realized by a general purpose and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method of controlling display of gifts in a web-based live broadcast, comprising:
    storing a host state gift object in a host state queue, wherein the host state gift object corresponds to a gift-giving behavior of a first user associated with a first client computing device, and the first user corresponds to a first user identification;
    storing a plurality of guest state gift objects in a guest state queue, wherein the plurality of guest state gift objects correspond to gift-giving behaviors of other users associated with other client computing devices, and the other users correspond to other user identifications;
    storing a plurality of display gift objects in a display queue, wherein each of the plurality of display gift objects in the display queue is associated with the first user identification or one of the other user identifications;
    updating the display queue based on data stored in the host state queue or the guest state queue, wherein the host state queue has a higher priority than the guest state queue for updating the display queue; and
    causing to display at least one of the plurality of display gift objects on an interface of the first client computing device in a form of a combo bar, wherein each combo bar displayed on the interface corresponds to one of the plurality of display gift objects in the display queue, each combo bar and a corresponding display gift object are associated with a same combo identification.

2. The method of claim 1, further comprising:
    receiving information indicative of a gift object to be stored, wherein the information comprises a combo identification to be stored and combo times associated with the combo identification to be stored;
    determining whether the host state queue, the guest state queue, and the display queue comprise a target gift object associated with a same combo identification as the combo identification to be stored;
    determining whether a numerical quantity of combo times associated with the target gift object is smaller than a numerical quantity of the combo times associated with the combo identification to be stored in response to determining that at least one of the host state queue, the guest state queue, or the display queue comprises the target gift object; and
    updating the target gift object based on the information indicative of the gift object to be stored in response to determining that the numerical quantity of combo times associated with the target gift objection is smaller than the numerical quantity of the combo times associated with the combo identification to be stored.

3. The method of claim 2, further comprising:
    determining whether a combo value corresponding to the gift object to be stored is greater than a combo value corresponding to one of the plurality of display gift objects in the display queue in response to determining that none of the host state queue, the guest state queue, and the display queue comprises the target gift object;
    updating the display queue by deleting a display gift object with a lowest combo value among the plurality of display gift objects and adding the gift object to be stored to the display queue as a new display gift object in response to determining that the combo value corresponding to the gift object to be stored is greater than the combo value corresponding to the one of the plurality of display gift objects in the display queue;
    determining whether a user identification associated with the gift object to be stored is the same as the first user identification in response to determining that the combo value corresponding to the gift object to be stored is not greater than the combo value corresponding to the one of the plurality of display gift objects in the display queue;
    updating the host state queue based on the information indicative of the gift object to be stored in response to determining that the user identification corresponding to the gift object to be stored is the same as the first user identification; and
    updating the guest state queue by adding the gift object to be stored as a new guest gift object in response to determining that the user identification corresponding to the gift object to be stored is different from the first user identification.

4. The method of claim 3, wherein the updating the guest state queue by adding the gift object to be stored as a new guest gift object further comprises:
    determining whether a storage capacity of the guest state queue is full;
    adding the gift object to be stored as the new guest gift object to an end of the guest state queue when the storage capacity is not full; and
    discarding the gift object to be stored when the storage capacity is full.

5. The method of claim 1, further comprising:
    determining whether a callback event associated with a combo bar displayed on the interface is detected;
    in response to determining that the callback event associated with the combo bar displayed on the interface is detected, determining whether there is updated data associated with a display gift object corresponding to the combo bar;
    performing a refresh operation on the combo bar in response to determining that there is updated data associated with the display gift object corresponding to the combo bar; and
    removing the display gift object corresponding to the combo bar from the display queue in response to determining that there is no updated data associated with the display gift object corresponding to the combo bar.

6. The method of claim 1, further comprising:
determining that a callback event associated with a combo bar displayed on the interface is detected;
obtaining a target display gift object from the display queue, wherein the target display gift object is newly added to the display queue;
determining whether a user identification associated with the target display gift object is the same as the first user identification;
determining whether the interface has a position for display of a host state combo bar in response to determining that the user identification associated with the target display gift object is the same as the first user identification; and
displaying a combo bar corresponding to the target display gift object on the interface as the host state combo bar in response to determining that the interface has the position for display of the host state combo bar.

7. The method of claim 6, further comprising:
in response to determining that the interface does not have the position for display of the host state combo bar, determining whether all of display positions on the interface have been used up;
displaying the combo bar corresponding to the target display gift object on the interface by inserting it into a vacant position of the interface in response to determining that the display positions on the interface have not been used up; and
displaying the combo bar corresponding to the target display gift object on the interface by deleting an existing combo bar from the interface and replacing the existing combo bar with the combo bar corresponding to the target display gift object in response to determining that the display positions on the interface have been used up.

8. The method of claim 6, further comprising:
in response to determining that the user identification associated with the target display gift object is different from the first user identification, determining whether all of display positions on the interface have been used up;
in response to determining that the display positions on the interface have been used up, determining whether a combo identification associated with an existing combo bar on the interface is the same as a combo identification associated with the target display gift object; and
refreshing the existing combo bar based on the target display gift object in response to determining that the combo identification of the existing combo bar is the same as the combo identification associated with the target display gift object.

9. The method of claim 8, further comprising:
determining whether a numerical quantity of combo times associated with the target display gift object is greater than a numerical quantity of combo times associated with the existing combo bar;
in response to determining that the numerical quantity of combo times associated with the target gift object is not greater than the numerical quantity of the combo times associated with the existing combo bar, discarding the target display gift object; and
in response to determining that the numerical quantity of combo times associated with the target gift object is greater than the numerical quantity of the combo times associated with the existing combo bar, refreshing the existing combo bar based on the target display gift object.

10. The method of claim 6, wherein when the user identification associated with the target display gift object is different from the first user identification, the method further comprises:
storing the target display gift object into a display container;
determining whether a number of current display containers is greater than a total number of display positions on the interface;
discarding the target display gift object when the number of the current display containers is greater than the total number of display positions on the interface;
determining whether a number of combo bars displayed on the interface is smaller than the total number of display positions when the number of the current display containers is not greater than the total number of display positions on the interface; and
displaying the combo bar corresponding to the target display gift object on the interface when the number of combo bars displayed on the interface is smaller than the total number of display positions on the interface.

11. The method of claim 1, further comprising:
storing each combo bar displayed on the interface in a combo bar buffer pool.

12. A system, comprising:
at least one processor; and
at least one memory communicatively coupled to the at least one processor and comprising computer-readable instructions that upon execution by the at least one processor cause the at least one processor to perform operations comprising:
storing a host state gift object in a host state queue, wherein the host state gift object corresponds to a gift-giving behavior of a first user associated with a first client computing device, and the first user corresponds to a first user identification;
storing a plurality of guest state gift objects in a guest state queue, wherein the plurality of guest state gift objects correspond to gift-giving behaviors of other users associated with other client computing devices, and the other users correspond to other user identifications;
storing a plurality of display gift objects in a display queue, wherein each of the plurality of display gift objects in the display queue is associated with the first user identification or one of the other user identifications;
updating the display queue based on data stored in the host state queue or the guest state queue, wherein the host state queue has a higher priority than the guest state queue for updating the display queue; and
causing to display at least one of the plurality of display gift objects on an interface of the first client computing device in a form of a combo bar, wherein each combo bar displayed on the interface corresponds to one of the plurality of display gift objects in the display queue, each combo bar and a corresponding display gift object are associated with a same combo identification.

13. The system of claim 12, the operations further comprising:
receiving information indicative of a gift object to be stored, wherein the information comprises a combo identification to be stored and combo times associated with the combo identification to be stored;

determining whether the host state queue, the guest state queue, and the display queue comprise a target gift object associated with a same combo identification as the combo identification to be stored;

determining whether a numerical quantity of combo times associated with the target gift object is smaller than a numerical quantity of the combo times associated with the combo identification to be stored in response to determining that at least one of the host state queue, the guest state queue, or the display queue comprises the target gift object; and updating the target gift object based on the information indicative of the gift object to be stored in response to determining that the numerical quantity of combo times associated with the target gift objection is smaller than the numerical quantity of the combo times associated with the combo identification to be stored.

14. The system of claim 13, the operations further comprising:

determining whether a combo value corresponding to the gift object to be stored is greater than a combo value corresponding to one of the plurality of display gift objects in the display queue in response to determining that none of the host state queue, the guest state queue, and the display queue comprises the target gift object;

updating the display queue by deleting a display gift object with a lowest combo value among the plurality of display gift objects and adding the gift object to be stored to the display queue as a new display gift object in response to determining that the combo value corresponding to the gift object to be stored is greater than the combo value corresponding to the one of the plurality of display gift objects in the display queue;

determining whether a user identification associated with the gift object to be stored is the same as the first user identification in response to determining that the combo value corresponding to the gift object to be stored is not greater than the combo value corresponding to the one of the plurality of display gift objects in the display queue;

updating the host state queue based on the information indicative of the gift object to be stored in response to determining that the user identification corresponding to the gift object to be stored is the same as the first user identification; and updating the guest state queue by adding the gift object to be stored as a new guest gift object in response to determining that the user identification corresponding to the gift object to be stored is different from the first user identification.

15. The system of claim 12, the operations further comprising:

determining whether a callback event associated with a combo bar displayed on the interface is detected;

in response to determining that the callback event associated with the combo bar displayed on the interface is detected, determining whether there is updated data associated with a display gift object corresponding to the combo bar;

performing a refresh operation on the combo bar in response to determining that there is updated data associated with the display gift object corresponding to the combo bar; and removing the display gift object corresponding to the combo bar from the display queue in response to determining that there is no updated data associated with the display gift object corresponding to the combo bar.

16. The system of claim 12, the operations further comprising:

determining that a callback event associated with a combo bar displayed on the interface is detected;

obtaining a target display gift object from the display queue, wherein the target display gift object is newly added to the display queue;

determining whether a user identification associated with the target display gift object is the same as the first user identification;

determining whether the interface has a position for display of a host state combo bar in response to determining that the user identification associated with the target display gift object is the same as the first user identification; and displaying a combo bar corresponding to the target display gift object on the interface as the host state combo bar in response to determining that the interface has the position for display of the host state combo bar.

17. The system of claim 16, the operations further comprising:

in response to determining that the interface does not have the position for display of the host state combo bar, determining whether all of display positions on the interface have been used up;

displaying the combo bar corresponding to the target display gift object on the interface by inserting it into a vacant position of the interface in response to determining that the display positions on the interface have not been used up; and displaying the combo bar corresponding to the target display gift object on the interface by deleting an existing combo bar from the interface and replacing the existing combo bar with the combo bar corresponding to the target display gift object in response to determining that the display positions on the interface have been used up.

18. The system of claim 16, wherein when the user identification associated with the target display gift object is different from the first user identification, the method further comprises:

storing the target display gift object into a display container;

determining whether a number of current display containers is greater than a total number of display positions on the interface;

discarding the target display gift object when the number of the current display containers is greater than the total number of display positions on the interface;

determining whether a number of combo bars displayed on the interface is smaller than the total number of display positions when the number of the current display containers is not greater than the total number of display positions on the interface; and displaying the combo bar corresponding to the target display gift object on the interface when the number of combo bars displayed on the interface is smaller than the total number of display positions on the interface.

19. The system of claim 12, the operations further comprising:

storing each combo bar displayed on the interface in a combo bar buffer pool.

20. A non-transitory computer-readable storage medium, storing computer-readable instructions that upon execution by a processor cause the processor to implement operations comprising:
- storing a host state gift object in a host state queue, wherein the host state gift object corresponds to a gift-giving behavior of a first user associated with a first client computing device, and the first user corresponds to a first user identification;
- storing a plurality of guest state gift objects in a guest state queue, wherein the plurality of guest state gift objects correspond to gift-giving behaviors of other users associated with other client computing devices, and the other users correspond to other user identifications;
- storing a plurality of display gift objects in a display queue, wherein each of the plurality of display gift objects in the display queue is associated with the first user identification or one of the other user identifications;
- updating the display queue based on data stored in the host state queue or the guest state queue, wherein the host state queue has a higher priority than the guest state queue for updating the display queue; and
- causing to display at least one of the plurality of display gift objects on an interface of the first client computing device in a form of a combo bar, wherein each combo bar displayed on the interface corresponds to one of the plurality of display gift objects in the display queue, each combo bar and a corresponding display gift object are associated with a same combo identification.

* * * * *